United States Patent
Bui et al.

(10) Patent No.: US 6,412,007 B1
(45) Date of Patent: Jun. 25, 2002

(54) MECHANISM FOR AUTHORIZING A DATA COMMUNICATION SESSION BETWEEN A CLIENT AND A SERVER

(75) Inventors: Sonny Bui, Huntington Beach; David Cates, Yorba Linda; Pauline Chen, Irvine; Terry Kerstetter, Dove Canyon; John Knight, Lake Forest; Kavita Shekhar Patil, Foothill Ranch; Thomas Anthony Roden, Irvine, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/231,926

(22) Filed: Jan. 14, 1999

(51) Int. Cl.$^7$ .................................................. G06F 15/16
(52) U.S. Cl. ...................... 709/227; 709/217; 709/219; 709/228; 709/249
(58) Field of Search .................................. 709/227, 203, 709/204, 217, 228, 229, 225, 230, 226, 245, 249, 206, 219

(56) References Cited

U.S. PATENT DOCUMENTS

| | | | |
|---|---|---|---|
| 5,586,260 A | 12/1996 | Hu | 395/200.2 |
| 5,752,041 A | 5/1998 | Fosdick | 395/712 |
| 5,898,780 A * | 4/1999 | Liu et al. | 380/25 |
| 5,918,019 A * | 6/1999 | Valencia | 709/227 |
| 6,011,910 A | 1/2000 | Chau et al. | 395/200.59 |
| 6,032,260 A | 2/2000 | Sasmazel et al. | 713/202 |
| 6,058,378 A * | 5/2000 | Clark et al. | 705/37 |
| 6,070,243 A * | 5/2000 | See et al. | 713/201 |
| 6,073,176 A * | 6/2000 | Baindur et al. | 709/227 |
| 6,088,451 A | 7/2000 | He et al. | 380/25 |
| 6,092,196 A | 7/2000 | Reiche | 713/200 |
| 6,101,616 A | 8/2000 | Joubert et al. | 714/11 |
| 6,105,069 A | 8/2000 | Franklin et al. | 709/229 |
| 6,112,305 A | 8/2000 | Dancs et al. | 713/156 |
| 6,119,160 A | 9/2000 | Zhang et al. | 709/224 |
| 6,144,959 A * | 11/2000 | Anderson et al. | 709/9 |
| 6,151,628 A | 11/2000 | Xu et al. | 709/225 |
| 6,230,281 B1 | 5/2001 | Brodfuhrer et al. | 714/4 |
| 6,249,811 B1 * | 6/2001 | Kido | 709/219 |

* cited by examiner

Primary Examiner—Ario Etienne
(74) Attorney, Agent, or Firm—Hickman Palermo Truong & Becker LLP

(57) ABSTRACT

A mechanism for authorizing a data communication session between a client and a first server is disclosed. When a request is received to establish a session with a particular entity that is associated with the client, it is determined whether authorization of the session can be performed locally at a second server. If it is determined that authorization of the session can be performed locally at the second server then, the first server is informed that the session may be established between the client and the first server for the particular entity. A third server that is associated with the particular entity is identified and once the first server is informed that the session may be established, the third server is informed that the session has been authorized to be established for the particular entity. However, if authorization of the session cannot be performed locally at the second server then, the third server is requested to authorize the session between the client and the first server. Thereafter, based on the response that is received from the third server, the first server is informed as to whether the session may be authorized.

28 Claims, 13 Drawing Sheets

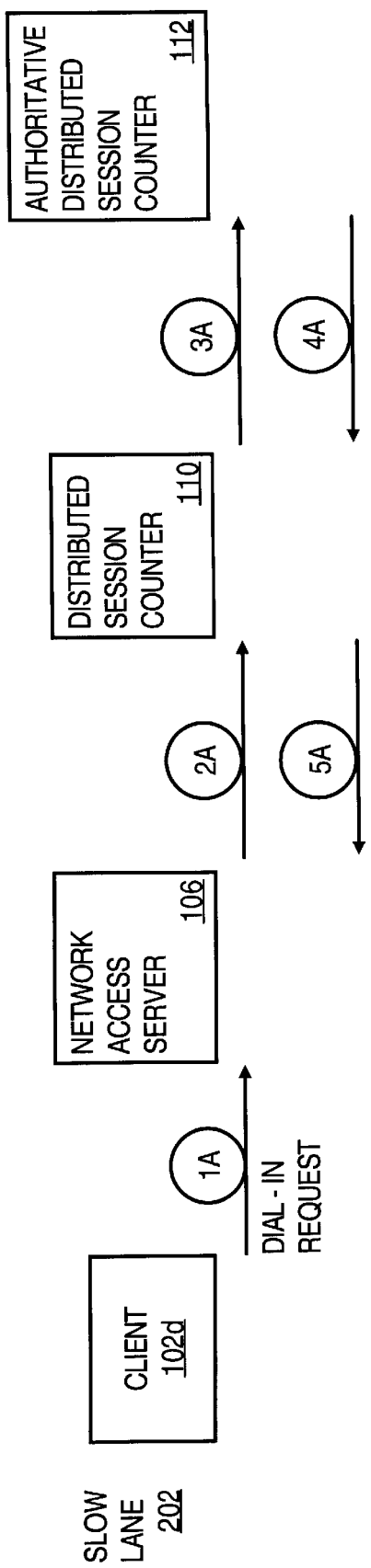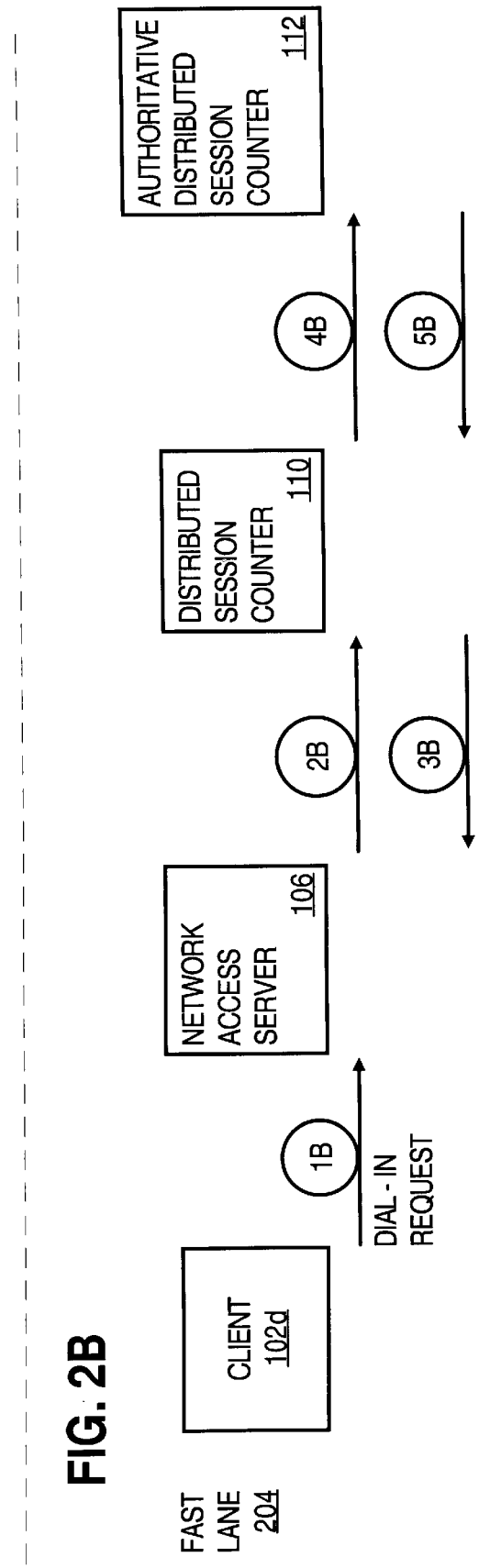

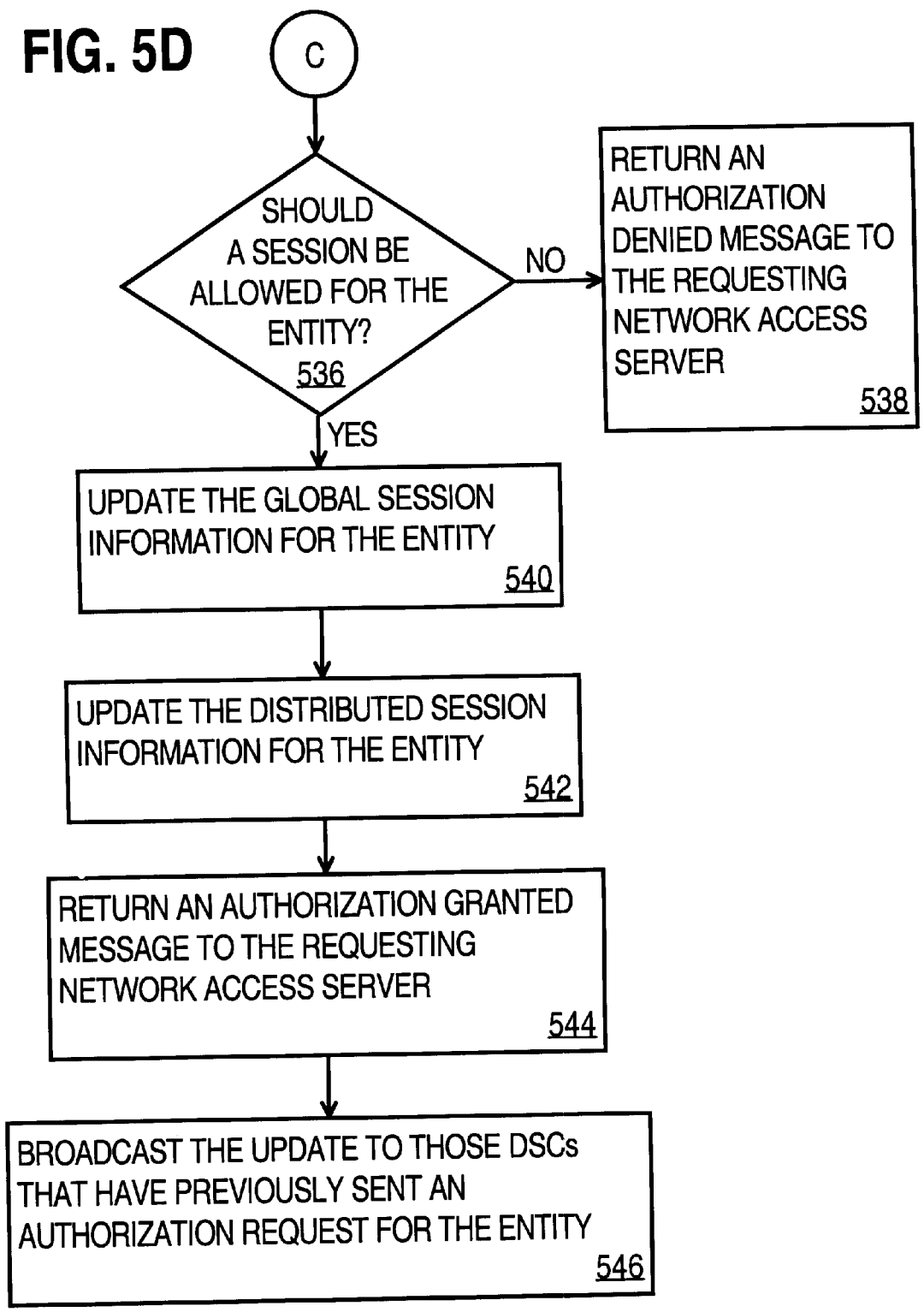

MECHANISM FOR AUTHORIZING A DATA COMMUNICATION SESSION BETWEEN A CLIENT AND A SERVER

COPYRIGHT AUTHORIZATION

A portion of the disclosure of this patent document contains material that is subject to copyright protection. The copyright owner has no objection to the facsimile reproduction by any one of the patent disclosures, as it appears in the U.S. Patent & Trademark Office patent files or records, but otherwise reserves all copyright rights whatsoever.

FIELD OF THE INVENTION

The present invention generally relates to the management of network systems, and more specifically to managing the access of a network system using distributed authorization that is controlled by distributed nodes.

BACKGROUND OF THE INVENTION

Many network systems can be remotely accessed. Through remote access, individuals can connect to the network system to access resources and obtain information while being located at a remote site. A popular method of providing remote access to a network is through the use of a dial-in network access server (NAS) that controls access to the network. For example, network access server model AS5300, commercially available from Cisco Systems, Inc., can be used to provide dial-in access to a network system. Individuals can access the network system by dialing into the network access server from a Remote Node to establish a connection. In this document, the term Remote Node refers to any client device, such as a personal computer (PC) or router, that can be used to dial in and establish a connection with a network access server. A client/server relationship exists between the Remote Node and the network access server.

To establish a connection with a particular NAS, a user interacts with the user's client computer to cause its modem to dial into the NAS. As part of the dial-in process, the client provides identification information, typically in the form of username/password information, to the NAS as part of a login dialogue. As a result, the NAS establishes a session for the particular user. In this context, a session is a specific connection that has been established for a particular user between a Remote Node and a server and which provides access to a network system. A session is generally identified by the numeric values of a remote port, remote IP address, local port, and local IP address. Once a session is established, the user can access network resources and information.

Controlling and monitoring the number of users or groups of users who are able to login and establish a session with an NAS can be important. For example, Internet Service Providers (ISPs) are in the business of allowing customers to login and establish sessions with an NAS to obtain access to resources that are available on the Internet. Several ISPs and Online Services, such as America Online® and CompuServe®, also provide their customers with access to proprietary information (such as proprietary databases and forums) and other online services that are available through their NAS connections. The ISPs and Online Services charge their customers a connection fee that is typically on an hourly connection or monthly flat fee basis. Thus, because their revenue is dependent on fees paid by their customers, ISPs and Online Services need to monitor and control the users or group of users that login and establish sessions with their NASs.

To reduce loads and better serve customers, ISPs and Online Services typically have a large number of NASs. In addition, because their customers may not be in a particular region, many ISPs and Online Services have distributed their NASs across wide geographic regions. A benefit of such distribution is that many customers may dial in and establish a session by a local call. Customers do not need to make a long distance call, and the ISPs and Online Services do not need to provide an "800" number to reduce their customer's connection costs.

However, a drawback with maintaining multiple NASs is that it can be difficult to control the actual number of sessions that are established by a particular user or group of users. A greater number of sessions may be established for a particular user or group of users than is actually authorized ("over-subscription"). For example, a company "A", who has employees located in five (5) cities (e.g., San Diego, Los Angeles, San Jose, San Francisco and Sacramento) may require and have paid ("subscribed") for a total of one hundred (100) sessions for its employees. If an NAS is located in each of the five cities, and each NAS allows a total of 100 sessions to be established by the employees of company "A", then a total of 500 sessions may actually be established by the employees of company "A", 400 of which are unauthorized. Thus, with multiple NASs, a large number of unauthorized sessions may be established. These unauthorized sessions can potentially represent a significant amount of lost revenue for the ISP. Also, because only a limited number of connections can be made with any one NAS, allowing a large number of unauthorized sessions to be established can significantly reduce the number of authorized sessions that can be established at particular one time.

One method of controlling the number of unauthorized sessions is by assigning a subset or portion of the authorized sessions to each of the NASs. For example, by dividing, between each of the NASs that are located in the different cities, the 100 sessions that are authorized to the employees of company "A", a total of 20 sessions can be established with each NAS. Thus, the employees of company "A" will be limited to at most the 100 authorized sessions between the NASs in the five different cities.

However, a drawback with this approach is that an employee who is located in a particular city may be denied a session with a the local NAS even though the total number of authorized sessions has not yet been established ("under-subscription"). For example, assume that 100 sessions have been authorized for the employees of company "A", and that each NAS in one of five cities is authorized to establish a maximum of 20 sessions. Assume further that a total of 20 sessions have already been established by the employees of company "A" with the NAS located in San Jose, but only 10 sessions have been established with each of the other four NASs in the other cities. A request to establish a session with the NAS in San Jose will be denied even though the authorized session limit of 100 has not yet been reached. Thus, splitting the number of authorized sessions between different NASs can produce the unwanted side effect of denying a valid connection request.

Another approach is to identify a central NAS that is used to control the number of sessions that can be established by a user or group of users at any one time. This approach assures that a connection request will not be denied even when the total number of authorized sessions has not yet been reached. Thus, before a NAS can establish a session, it must first communicate with the central NAS to determine whether the maximum number of authorized sessions has already been reached for the particular user or group of users. If a maximum number of sessions have already been established, then the connection request is denied. Conversely, if central NAS indicates that the maximum number has not yet been reached, then the connection request is granted.

However, a serious drawback is associated with always having to communicate with a central NAS to determine whether a connection request should be granted to a particular user or group of users. This approach requires a significant amount of additional communication overhead to determine whether a connection request should be granted. This overhead can significantly degrade the response time for establishing sessions to a network system.

For example, assume that the central NAS is in San Jose. Whenever a connection request is received by the NAS located in San Diego, the San Diego NAS must first communicate with the San Jose NAS to determine whether an additional session may be established for the particular user or group of users. Upon receiving the message, the San Jose NAS must determine whether the total number of authorized sessions have already been established for the particular user or group of users. The San Jose NAS must then send a message to the San Diego NAS indicating whether the session should be granted. The communication overhead that is required in communicating with a central NAS each time a connection request is received can significantly increase the amount of time that is required to establish a session with a non-central NAS. In addition, in larger systems where dozens or even hundreds of NASs are used to provide access to a network system, the delay caused by using a central NAS can dramatically increase the amount of time that is required to establish a session.

Based on the foregoing, there is a clear need for a mechanism that can be used to control and manage the number of sessions that can be established with a network access server by a particular user or group of users for accessing a network system.

There is also a clear need for a mechanism that can reduce the communication overhead that is typically required in controlling the number of users or group of users that can establish a session with a set of network access servers for accessing a network system.

SUMMARY OF THE INVENTION

The foregoing needs, and other needs and objects that will become apparent from the following description, are achieved in the present invention, which comprises, in one aspect, a method for authorizing a data communication session between a client and a first server, comprising the computer-implemented steps of receiving a request to establish the session, wherein the request is associated with a particular entity that is associated with the client. The method then determines whether authorization of the session can be performed locally at a second server. If authorization of the session can be performed locally at the second server, then the first server is informed that the session may be established between the client and the first server for the particular entity. A third server that is associated with the particular entity is identified. After informing the first server, the third server is informed that the session has been authorized to be established for the particular entity.

One feature of this aspect is that the step of determining whether authorization of the session can be performed locally at the second server comprises determining a session counter value that indicates the number of sessions that are currently active for the particular entity; determining a session threshold value that indicates a threshold as to a number of sessions that may be currently active before sessions cannot be authorized locally by the second server; and comparing the session counter value with the session threshold value to determine whether authorization of the session can be performed locally at the second server.

Yet another feature comprises, if authorization of the session cannot be performed locally at the second server, requesting the third server to authorize the session between the client and the first server, and informing the first server based on a response received from the third server as to whether the session may be authorized.

According to another feature, a method for broadcasting session information to one or more servers is provided. A message is received from a first server. The message indicates that a session has been authorized for a particular entity. Whether one or more other servers have previously authorized sessions for the particular entity is determined. If one or more other servers have previously authorized sessions for the particular entity, then the one or more other servers are informed that another session has been authorized for the particular entity.

In yet another feature, the method further includes, prior to receiving the message from the first server, maintaining data that is associated with a second server. The data includes a session counter value that indicates the number of sessions that are currently active for the particular entity; and a server list that identifies the one or more other servers that have previously authorized sessions for the particular entity.

The invention also encompasses a computer-readable medium, a computer data signal embodied in a carrier wave, and an apparatus configured to carry out the foregoing steps.

These features provide an intuitive control mechanism that allows operators to tune their systems to balance the tradeoffs between speed and accuracy. The features are applicable to many forms of resource allocation, management, and provisioning. They may also have applications in systems that include one or more values that have a definable maximum rate of change.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2A is a block diagram illustrating a communication sequence for authorizing a session between a client and a network access server;

FIG. 2B is a block diagram illustrating another communication sequence for authorizing a session between a client and a network access server;

FIG. 5D is a flow diagram that illustrates further steps in the method of FIG. 5A;

DETAILED DESCRIPTION OF THE PREFERRED EMBODIMENT

Figure 1A:
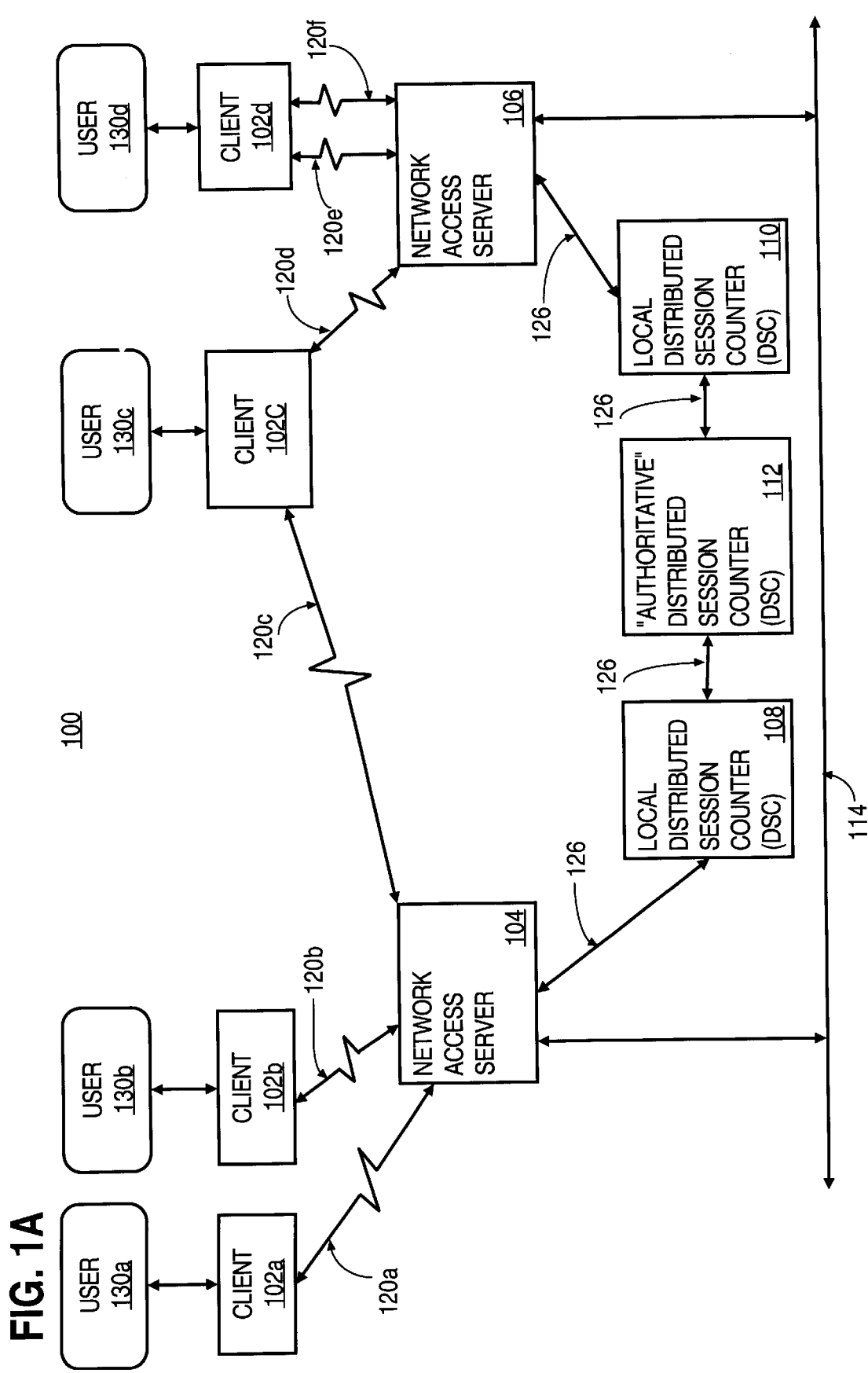
FIG. 1A is a block diagram of a computer system architecture in which the present invention may be utilized.

A method and apparatus for managing the access of a network system using a distributed authorization model is disclosed. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Operational Context

A distributed authorization mechanism is provided for managing and regulating connections to a network system. In one embodiment, when a network access server receives a message from a client requesting that a connection be established for accessing a network system, the network access server sends an authorization request message to a "local" distributed session counter ("DSC") requesting authorization to establish a session with the client. Upon receiving the authorization request message, the local DSC determines whether it can authorize the session itself (the "FAST LANE" approach) or whether the local DSC must communicate with an "authoritative" DSC to determine whether the session should be authorized (the "SLOW LANE" approach).

The terms "local" and "authoritative" are merely convenient labels for the elements that serve as distributed session counters. The term "local" means only that a particular DSC is not authoritative for the particular entity of reference and is not intended to imply a required geographic location.

In one embodiment, to determine whether FAST LANE authorization can be performed, the local DSC retrieves a local session count to determine the number of sessions that are currently established for the particular entity. In this context, a particular entity includes both single users and groups of users. For example, a particular entity may be (1) an individual such as "John"; (2) employees of a particular group of a company, such as the marketing or engineering group; or (3) all employees or groups of individuals that make up a particular company or organization.

After determining the number of sessions that are currently established for the particular entity, the local DSC compares the number of sessions that are currently established for the particular entity with a "local" session threshold value that is maintained for the particular entity. In this context, a local threshold value identifies a maximum number of sessions that may be currently established for a particular entity before SLOW LANE authorization is required. By adjusting the local threshold values, the performance of the distributed system can be tuned to provide faster connection response time (FAST LANE) or a more accurate control of the number of sessions that are established for each entity.

Thus, based on the comparison, the local DSC determines whether it can authorize the session itself (FAST LANE) or whether it must communicate with an authoritative DSC to determine whether the session should be allowed (SLOW LANE). If the local DSC determines that it can authorize the session itself, it sends an authorization grant message back to the network access server without requesting authorization from the authoritative DSC. Thereafter, the local DSC sends a message to the authoritative DSC indicating that a session was authorized for the particular entity.

However, if the local DSC determines that it cannot authorize the session itself, the local DSC sends an authorization request message to the authoritative DSC requesting authorization for establishing a session for the particular entity. Upon receiving the authorization request message from the local DSC, the authoritative DSC determines whether a session should be authorized for the particular entity. In one embodiment, upon receiving the authorization request, the authoritative DSC determines the number of sessions that are currently established for the particular client. In certain embodiments, the authoritative DSC retrieves a "global" session count to determine the number of sessions that are currently established for the particular entity. The authoritative DSC then compares the global session count with a "total" session threshold value that is associated with the particular entity. In this context, the total session threshold value represents the total number of sessions that are to be allowed for a particular entity at any one point in time.

Based on the comparison, the authoritative DSC determines whether the session should be allowed for the particular entity. If the authoritative DSC determines that the session should not be authorized, the authoritative DSC returns an Authorization Denied message back to the local DSC. The local DSC then sends an Authorization Denied message to the network access server to indicate that the session should not be established with the client for the particular entity.

Alternatively, if the authoritative DSC determines that the session should be authorized, the authoritative DSC returns an Authorization Granted message back to the local DSC. The local DSC then sends an Authorization Granted message to the network access server to indicate that the session can be established with the client for the particular entity.

FIG. 1A is a block diagram of a system 100 in which the invention can be used. Generally, the system 100 includes one or more clients 102*a–d,* one or more network access servers 104, 106, one or more local distributed session counters (DSCs) 108, 110, an authoritative DSC 112, and a network 114.

Each of the clients 102*a–d* may be a device, such as a personal computer, workstation, router, switch or other network device. The particular form of a client 102*a–d* is not critical. What is important is that the clients 102*a–d* are capable of dialing into network access server 104, 106 to establish sessions 120a–f, respectively. The clients 102a–d are respectively used by or associated with users 130a–d. In this example, the users 130a–d represent different entities that interact with clients 102a–d. Although FIG. 1A depicts only a single user (entity) interfacing with each of the clients 102a–d to establish sessions with network access servers 104, 106, in certain embodiments, multiple users (entities) may interface with one client to establish sessions with network access servers 104, 106.

Remote dial-in connections are typically made using one of the Internet's standard dial-in protocols, such as Point-to-Point Protocol (PPP) or the Serial Line Internet Protocol (SLIP). In a preferred embodiment, each connection 120a–d is established as PPP connections. However, PPP is merely an example of a communications protocol that can be used in an embodiment. Other protocols, such as SLIP, which facilitate the exchange of information between a client and server can be used. PPP is described in "Understanding PPP and PPP Authentication," accessible at http://www-fr.cisco.com/warp/public/779/smbiz/service/knowledge/wan/ppp_auth.htm. PPP is defined in W. Simpson, "The Point-to-Point Protocol," RFC 1548, December 1993. The multilink variant of PPP is described in K. Sklower et al., "The PPP Multilink Protocol (MP)," RFC 1990, August 1996.

Network 114 contains resources and information that are protected by and accessible through network access servers 104, 106. Network 114 may be the global packet-switched network known as the Internet, a private Intranet for a particular company, or any combination thereof. The network 114 may form part of a LAN or WAN and may use a variety of different communication protocols.

The network access servers 104, 106 are computers, or one or more hardware or software components or processes that cooperate or execute in one or more computer systems. The network access servers 104, 106 are coupled to the network 114 and provide remote access to the network 114 for clients 102a–d. Model AS5300, commercially available from Cisco Systems, Inc., can be used as network access servers 104, 106.

In certain embodiments, a firewall (not shown), such as the Cisco PIX Firewall, which is commercially available from Cisco Systems, Inc. may be logically interposed between the network access servers 104, 106, and network 114. The firewall may control access and log-in attempts to network 114 based on identification information that is associated with the outside communication, by intercepting all communications moving to and from the network access servers 104, 106 and determining whether to admit or block the communications. The firewall can be used to prevent unauthorized clients from connecting to network 114 and other devices that are logically behind the firewall.

The network access servers 104, 106 communicate respectively with local DSCs 108, 110 to determine whether a session should be allowed for a particular entity. In this configuration, the local DSCs 108 and 110 function in a manner that is similar to a cache. For example, by "caching" a local threshold value at the local DSCs, a determination can be made as whether a session request can be authorized locally (FAST LANE) or whether communication with an authoritative DSC is required (SLOW LANE).

The network access servers may function as both a client and a server in communicating with the other components. In one embodiment, network access servers 104, 106 are respectively coupled to DSC 108 and DSC 110 over network 126 as shown in FIG. 1A. It should be noted that although FIG. 1A depicts only a single network access server connected to a particular DSC, in certain embodiments, multiple network access servers may connect to a particular DSC.

In this example, for explanation purposes and so as to not obscure certain connections between the components of system 100, authoritative DSC 112 has been illustrated as not being connected to a network access server. However, in a preferred embodiment, one or more network access servers are coupled to authoritative DSC 112. In this context, the authoritative DSC 112 may function as both an authoritative DSC and a local DSC in determining whether a session should be allowed for a particular entity.

The DSCs 108, 110 and 112 may be implemented in one or more servers. Thus, although the term DSC has been used in this context, other terms such as Max Session Server may also be used to describe these components. In certain embodiments, the network access servers and the DSCs may both or separately be configured to execute the Cisco Internetworking Operating System (IOS). In a preferred embodiment, the network 114 includes one or more authorization, authentication, and accounting (AAA) servers (not shown) that execute as part of the network operating system to carry out network authentication and authorization. In a preferred embodiment, the AAA servers reside within the same box or hardware unit as the DSCs. In this context, the DSC functions as a "library" when queried by the AAA server to determine whether a session should be authorized for a particular entity. In addition, in a preferred embodiment, the communication between two DSCs and between a network access server and a DSC is performed by the AAA server that is associated with a DSC.

Appendix A sets forth a preferred communication protocol that may be used, in one embodiment, for communicating between different DSCs and between a DSC and a GUI Administration tool.

Figure 1B:
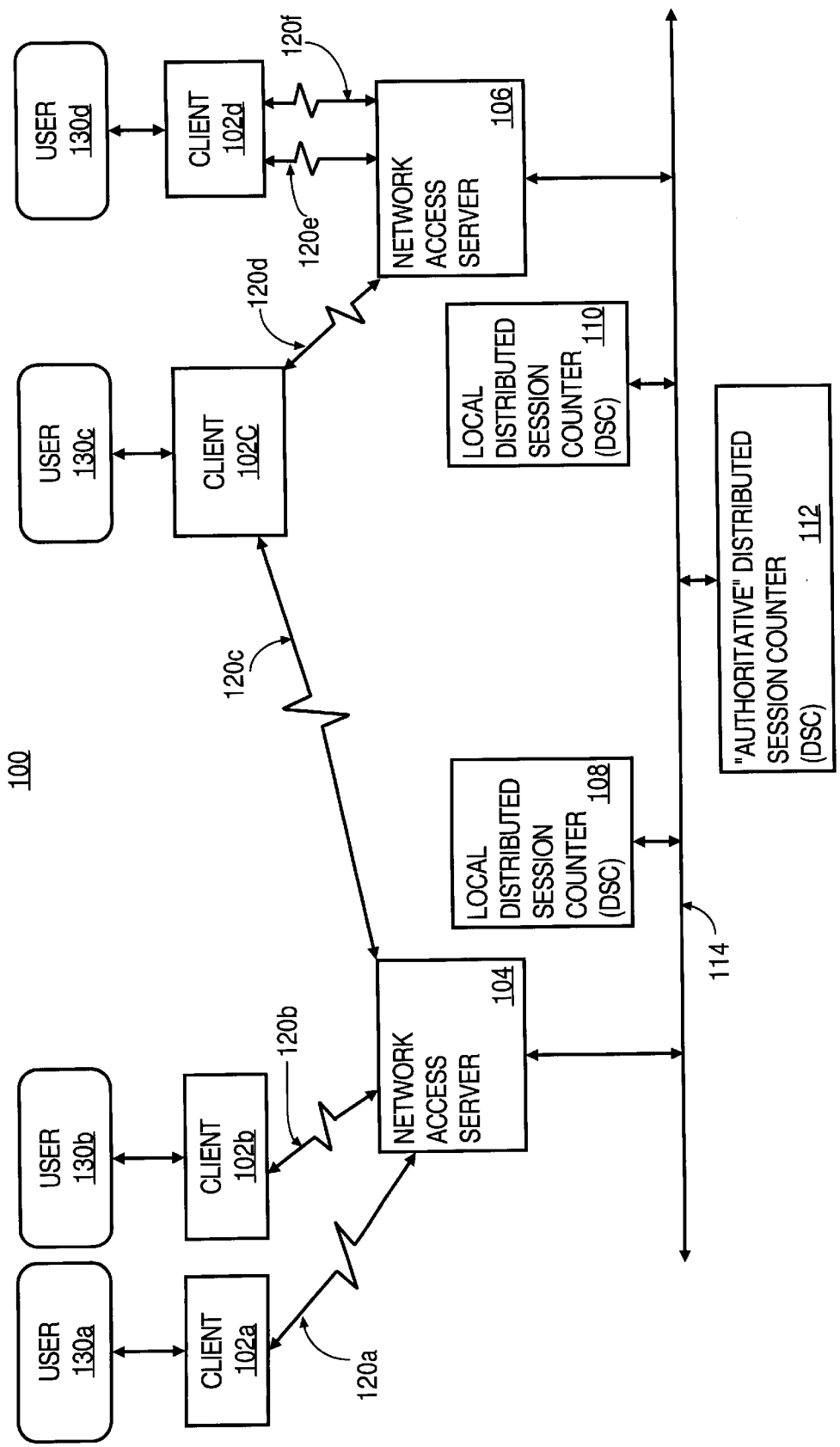
FIG. 1B is a block diagram of another computer system architecture in which the present invention may be utilized.

FIG. 1B shows an alternative embodiment in which network access servers 104, 106 may be respectively coupled to local DSCs 108, 110 over network 114. For example, local DSCs 108, 110, and authoritative DSC 112 may be coupled to a network system such as the Internet and as such, may communicate with network access servers 104, 106 via the Internet. In certain embodiments, messages that are communicated between network access servers and DSCs are encrypted to maintain a secure communication link over network 114. For example, messages communicated between the network access servers 104 and 106 and the local DSCs 108 and 110 may be encrypted to maintain a secure communication link over network 114. In addition, messages that are communicated between the different DSCs may also be encrypted to provide for a higher level of security.

The local DSCs 108, 110 are computers, or one or more hardware or software components or processes that cooperate or execute in one or more computer systems. In one embodiment, session information is distributed across local DSCs 108, 110 to provide for local authorization of connection requests. For example, local DSCs 108, 110 respectively maintain "distributed session information" for network access servers 104, 106. The distributed session information is used to determine whether local DSCs 108, 110 can themselves authorize connection requests from respective network access servers 104, 106 (FAST LANE), or whether local DSCs 108, 110 need to communicate with the authoritative DSC 112 for authorization (SLOW LANE). The distributed session information that is maintained by the local DSCs 108, 110 is described further below.

The authoritative DSC 112 is also a computer, or one or more hardware or software components or processes that cooperate or execute in one or more computer systems. The authoritative DSC 112 maintains "global session information" that is used, when requested by local DSCs 108, 110, to determine whether a session should be authorize for a particular entity. The authoritative DSC 112 is also responsible for broadcasting global session information to some or all of the one or more local DSCs 108, 1 10 so that they may maintain up-to-date session information.

"FAST LANE" AND "SLOW LANE" COMMUNICATION SEQUENCES

As previously indicated, using the distributed authorization model, the authorization of a connection request for a particular entity can be performed by a FAST LANE or SLOW LANE authorization communication sequence. In the FAST LANE communication sequence, the time that is required to authorize a connection can be significantly reduced, as the authorization of the connection can be performed locally. The terms "FAST LANE" and "SLOW LANE" are merely labels that suggest the differences of the two communication sequences or approaches, and these terms do not imply or require any particular structure or process in and of themselves.

FIG. 2A and FIG. 2B illustrate examples of a SLOW LANE communication sequence 202 and a FAST LANE communication sequence 204 for authorizing a session between a client and a network access server. For purposes of these examples, assume that user 130a interacts with client 102a to establish a session between client 102a and network access server 104.

In the SLOW LANE communication sequence 202, at state 1A, client 102a dials into network access server 104 to request a session for user 130a. At state 2A, the network access server 104 sends a connection request message to local DSC 108, requesting authorization to establish the session. Upon receiving the connection request message, local DSC 108 compares its session threshold value that is associated with user 130a, with a local session count value. The local session count value represents a local count of the number of sessions that are currently established for user 130a. As a result, local DSC 108 determines whether authorization can be performed locally by DSC 108.

In this example, assume that local DSC 108 determines that the local session for user 130a is currently greater than or equal to the session threshold value associated with user 130a and, therefore, local DSC 108 cannot authorize the session itself, locally. Consequently, at state 3A, local DSC 108 sends an authorization request message to authoritative DSC 112 requesting authorization to establish a session for user 130a. Upon receiving the authorization request message, authoritative DSC 112 determines whether a session should be authorized for user 130a. At state 4A, after determining whether the session should be allowed, authoritative DSC 112 sends a message back to local DSC 108 indicating whether or not the session is authorized. At state 5A, based on the response from authoritative DSC 112, local DSC 108 sends a message to network access server 104 indicating whether or not the session for user 130a should be established. Finally, if the session has been authorized, network access server 104 may then establish a session with client 102a for user 103a.

In the FAST LANE communication sequence 204, at state 1B, client 102a dials into network access server 104 to request that a connection be established for user 130a. At state 2B, network access server 104 sends a connection request message to local DSC 108 requesting authorization to establish a session for user 130a. Upon receiving the request, local DSC 108 compares its session threshold value that is associated with user 130a, with a local session count value. The local session count value represents a local count of the number of sessions that are currently established for user 130a. Accordingly, local DSC 108 determines whether it can perform authorization locally itself.

In this example, assume that local DSC 108 determines that the local session count for user 130a is currently less than the session threshold value associated with user 130a and, therefore, local DSC 108 can authorize the session itself (locally). As a result, at state 3B, local DSC 108 sends a message to the network access server 104 indicating that a session may be established for user 130a. Network access server 104 may then proceed to establish a session with client 102a for user 103a. At state 4B, the local DSC 108 sends a message to the authoritative DSC 112 indicating that a session has been authorized between client 102a and network access server 104 for user 130a. Upon receiving the notification, authoritative DSC 112 updates its global session information to reflect the authorization of the session. At state 5B, authoritative DSC 112 sends a message back to DSC 108 indicating the global session information was updated to reflect the newly established session.

As illustrated, the FAST LANE communication sequence 204 provides a faster authorization response time as authorization can be performed without having to first communicate with the authoritative DSC 112. In certain systems, in which a large number of connection requests may be made concurrently, eliminating the need of having to first communicate with the authoritative DSC 112 for authorization can significant reduce the systems authorization response time.

Distributed Session Counter Configuration

Figure 3:
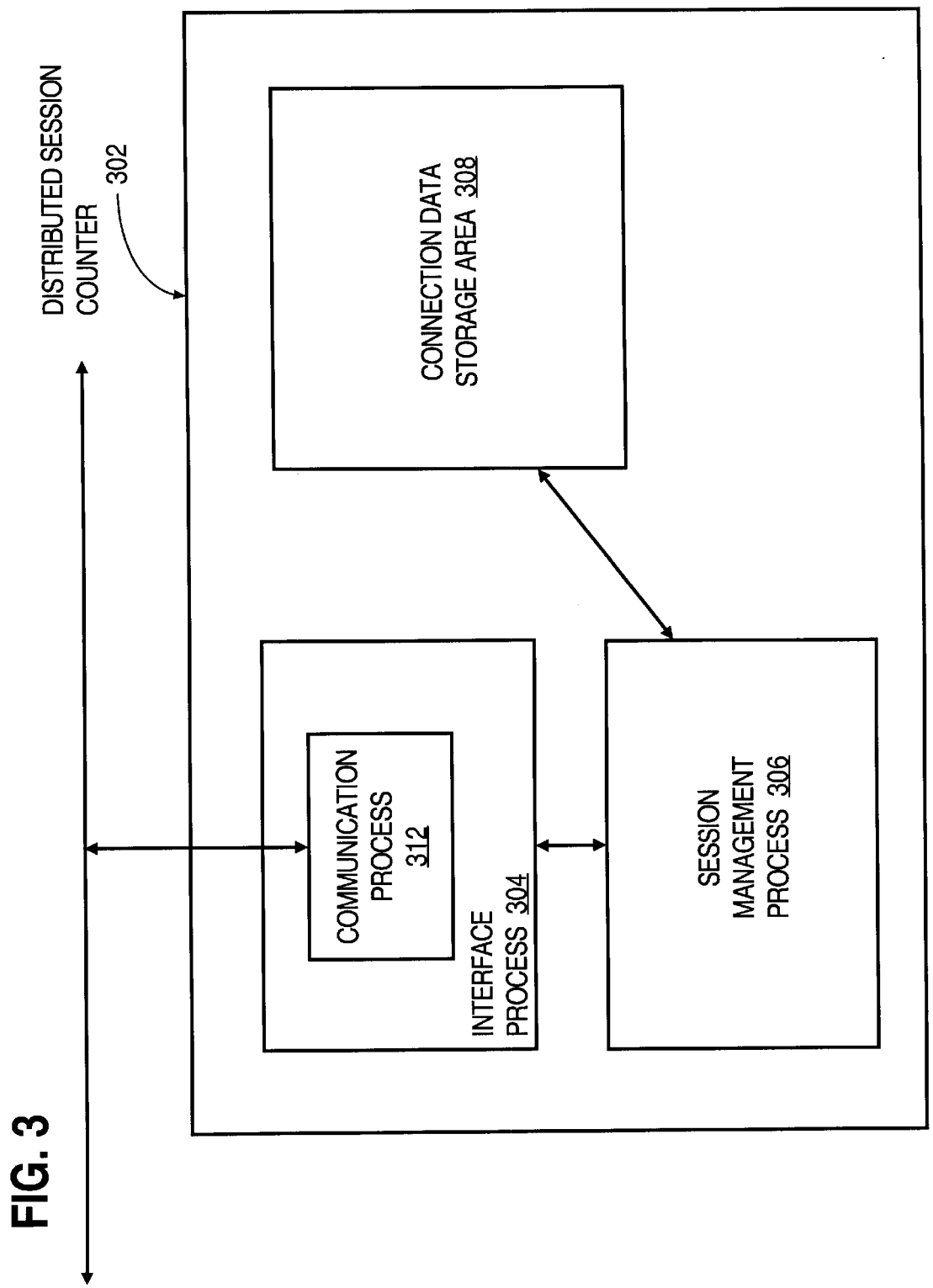
FIG. 3 is a block diagram showing certain internal details of a distributed session counter that is shown in FIG. 1A and FIG. 1B.

FIG. 3 is a block diagram of one embodiment of a distributed session counter 302 showing certain internal details. In certain embodiments, a particular DSC may function as a local DSC, an authoritative DSC or both, as described further below. Each DSC may also function as both a client and a server in communicating with other components of system 100. In one embodiment, the DSCs are configured to execute the Cisco Internetworking Operating System (IOS). In addition, as previously described above, distributed session counter 302 may actually reside within or as part of an AAA server.

In this example, DSC 302 includes an interface process 304, a session management process 306, and a connection data storage area 308. The interface process 304 provides a communication interface that allows DSC 302 to communicate with network access servers and other DSC devices. In certain embodiments, the interface process 304 may have a communication process 312 that can respond to requests from other network access servers and DSC devices. Communication process 312 is a software element, in the preferred embodiment. In one embodiment, communication between the DSC 302 and other network access servers and DSCs may be performed using a client/server relationship. In certain embodiments, the interface process 304 may act as both a client and a server to communicate with other network access servers and DSCs.

Coupled to the interface process 304 is a session management process 306, which is responsible for processing messages received by the interface process 304, and for causing messages to be communicated to the other network access servers and DSCs. In one embodiment, session management process 306 manages, regulates and coordinates the authorizing of sessions for requesting entities. To perform this task, the session management process interfaces with the connection data storage area 308 to store and retrieve connection information.

In one embodiment, when acting as a local DSC, the connection data storage area is used to maintain distributed session information. In certain embodiments, the connection data storage area maintains distributed session information for each entity that has requested a session be established with the particular DSC. The distributed session information for each local DSC may include, but is not limited to, the following information for each entity that has requested a session be established: (1) a local session counter that indicates the total number of sessions that are currently established for the particular entity; (2) a local session threshold that represents a limit as to the number of sessions that can be concurrently established for a particular entity without having to obtain authorization by the authoritative DSC; and (3) an authoritative DSC identifier that indicates a particular DSC that has been assigned as the authoritative DSC for a particular entity.

Table 1 and Table 2 respectively depict examples of the distributed session information that may be maintained in the connection storage area of local DSCs 108, 110 of FIG. 1.

TABLE 1

DISTRIBUTED SESSION INFORMATION

| ENTITY | LOCAL SESSION THRESHOLD | LOCAL SESSION COUNTER | AUTHORITATIVE DSC IDENTIFIER |
|---|---|---|---|
| user 130a | 5 | 1 | DSC 112 |
| user 130b | 10 | 1 | DSC 112 |
| user 130e | 35 | 2 | DSC 112 |

TABLE 2

DISTRIBUTED SESSION INFORMATION

| ENTITY | LOCAL SESSION THRESHOLD | LOCAL SESSION COUNTER | AUTHORITATIVE DSC IDENTIFIER |
|---|---|---|---|
| user 130c | 35 | 2 | DSC 112 |
| user 130d | 10 | 2 | DSC 112 |

Examples of other information that may be contained in the distributed session information include: (1) a DSC session counter for each entity that indicates the number of sessions that have been authorized by the particular DSC (either FAST LANE or SLOW LANE); (2) a DSC session counter for each entity that indicates the number of sessions that have been authorized by the particular DSC (either FAST LANE or SLOW LANE) and which are still currently active; (3) a DSC rejection counter for each entity that indicates the number of connection requests that have been denied by the particular DSC; (4) session termination information that indicates the reason that a session that was authorized by the particular DSC terminated; (5) connection identity information that identifies for each DSC the particular NAS and port that was used to establish a particular session; (6) over-subscription counters that identify for each DSC the number of times over-subscription has occurred for a particular entity; (7) high-water mark indicators that identify for each DSC the extent to which over-subscription has occurred for a particular entity; and (8) various other statistical information that can be used by a local DSC or system administrator to monitor and tune the distributed authorization model.

As previously indicated, a particular DSC may perform the functions of an authoritative DSC instead of, or in addition to acting as a local DSC. In one embodiment, when acting as an authoritative DSC, the connection data storage area is used to maintain global session information. In certain embodiments, the connection data storage area maintains global session information for each entity in which the particular DSC is designated as the authoritative DSC. The global session information for each global DSC may include, but is not limited to, the following information: (1) a global session counter variable that indicates the number of sessions that are currently established for a particular entity; (2) a global session threshold variable that represents a limit as to the total number of sessions that can be concurrently established for the particular entity; and (3) a local DSC list that identifies one or more local DSCs through which authorization of a session for the particular entity has previously been requested.

For example, Table 3 illustrates that the global distributed session information may be maintained in the connection storage area of authoritative DSC 112 of FIG. 1.

TABLE 3

GLOBAL DISTRIBUTED SESSION INFORMATION

| ENTITY | GLOBAL SESSION THRESHOLD | GLOBAL SESSION COUNTER | LOCAL DSC LIST |
|---|---|---|---|
| user 130a | 10 | 1 | DSC 108 |
| user 130b | 15 | 1 | DSC 108 |
| user 130c | 100 | 2 | DSC 108, DSC 110 |
| user 130d | 25 | 2 | DSC 110 |

Examples of other information that may be contained in the global session information include: (1) a DSC session counter for each entity that indicates the number of sessions that have been authorized for a particular DSC; (2) a DSC active session counter for each entity that indicates the number of sessions that have been authorized for a particular DSC and which are still currently active; (3) a DSC rejection counter that indicates for each DSC the number of authorization requests that have been denied on a per entity basis; (4) a DSC over-subscription counter that indicates for each DSC the number of times over-subscription has occurred for a particular entity; (5) a DSC over-subscription watermark that indicates the extent of over-subscription that has occurred for each entity at each NAS; (6) a DSC reserved session counter for each entity that indicates the current number of sessions that are reserved (allocated) but are not yet active; and (7) various other statistical information that may be used by an authoritative DSC or system administrator to monitor and tune the distributed authorization model.

Using the global session information, authoritative DSC 112 can determine the one or more local DSCs through which a session for a particular entity was established. Using this information, the authoritative DSC can determine to which local DSCs it must broadcast data, so as to inform the local DSCs of the total number of sessions that are currently established for a particular entity. In a preferred embodiment, whenever a global session counter is updated in any manner (incremented, decrement or reset), the authoritative DSC broadcasts the updated value to the local DSCs that are identified in its local DSC list.

Regulating the Number of Sessions Established by an Entity

Figure 4:
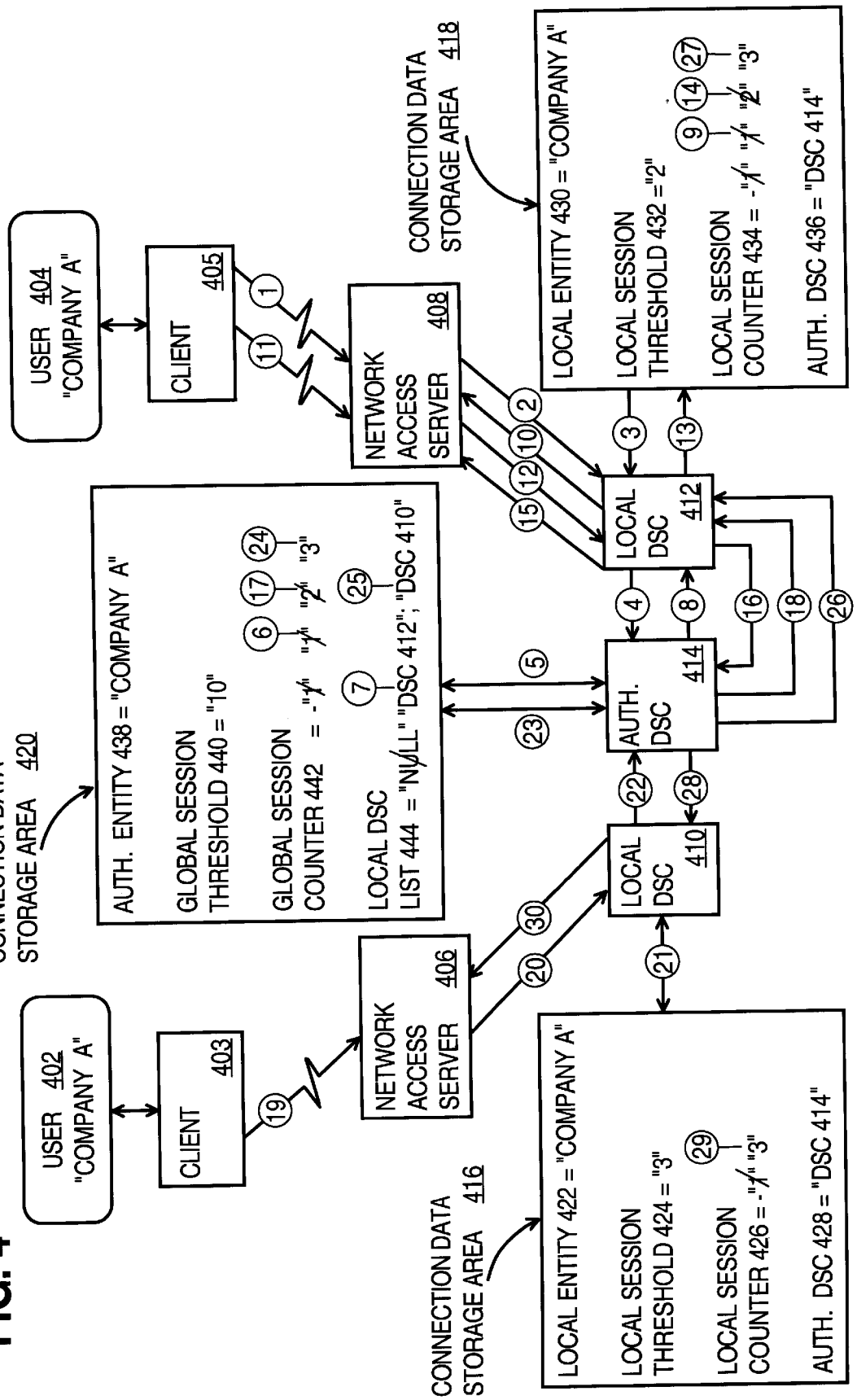
FIG. 4 is a block diagram illustrating a distributed authorization mechanism that may be used to regulate the number of sessions that are established.
Figure 5A:
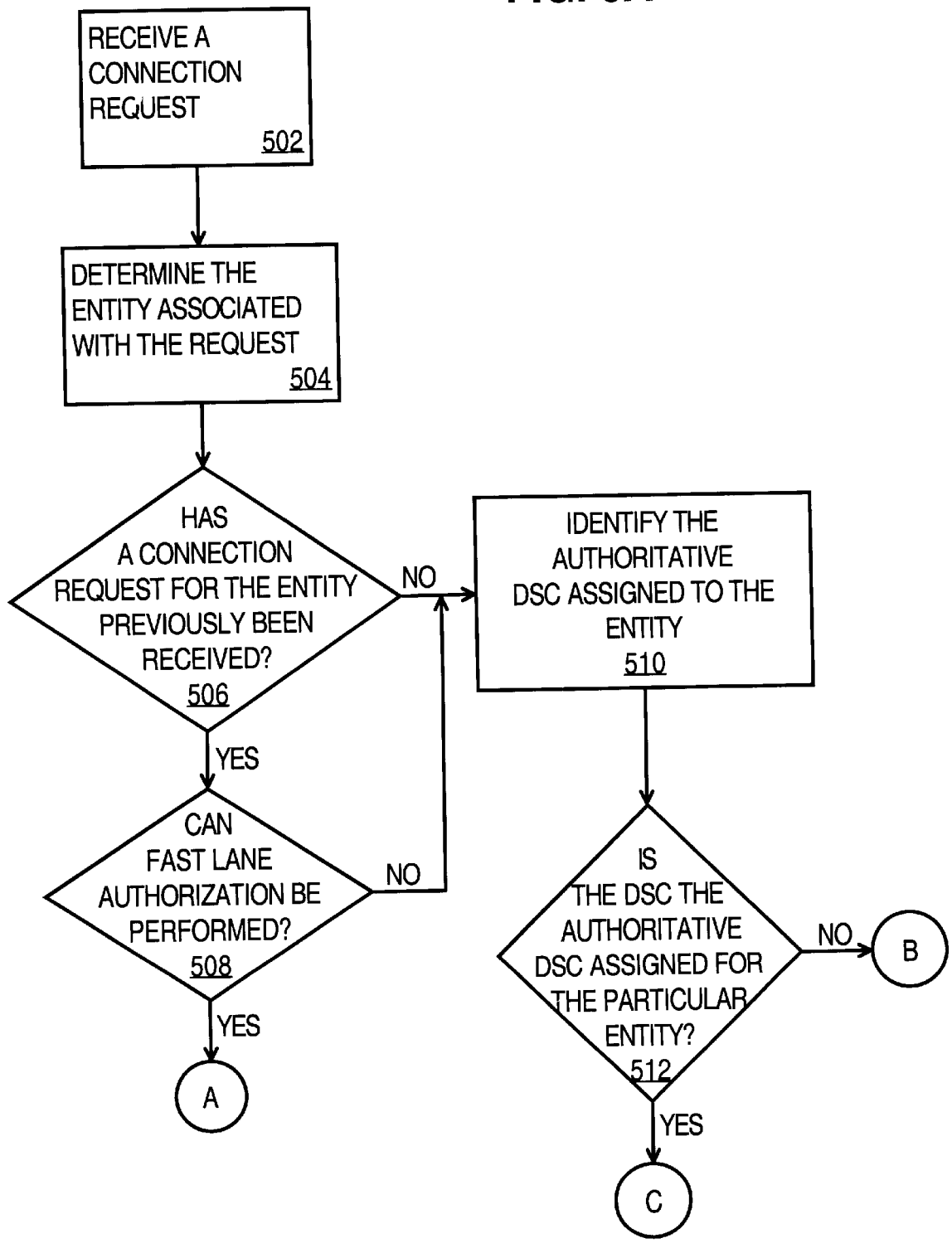
FIG. 5A is a flow diagram that illustrates steps involved in a method for authorizing connection requests.
Figure 5B:
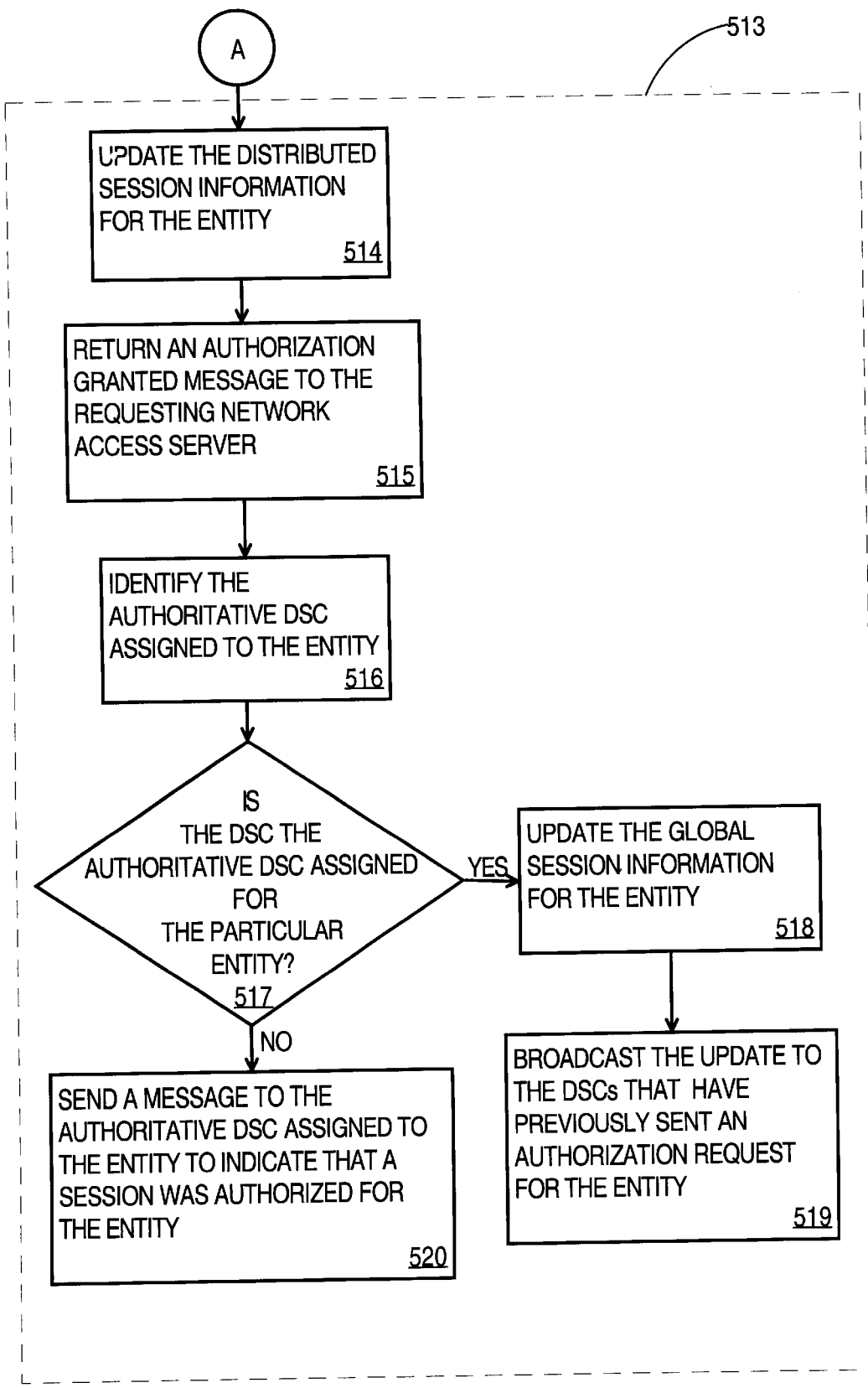
FIG. 5B is a flow diagram that illustrates further steps in the method of FIG. 5A.
Figure 5C:
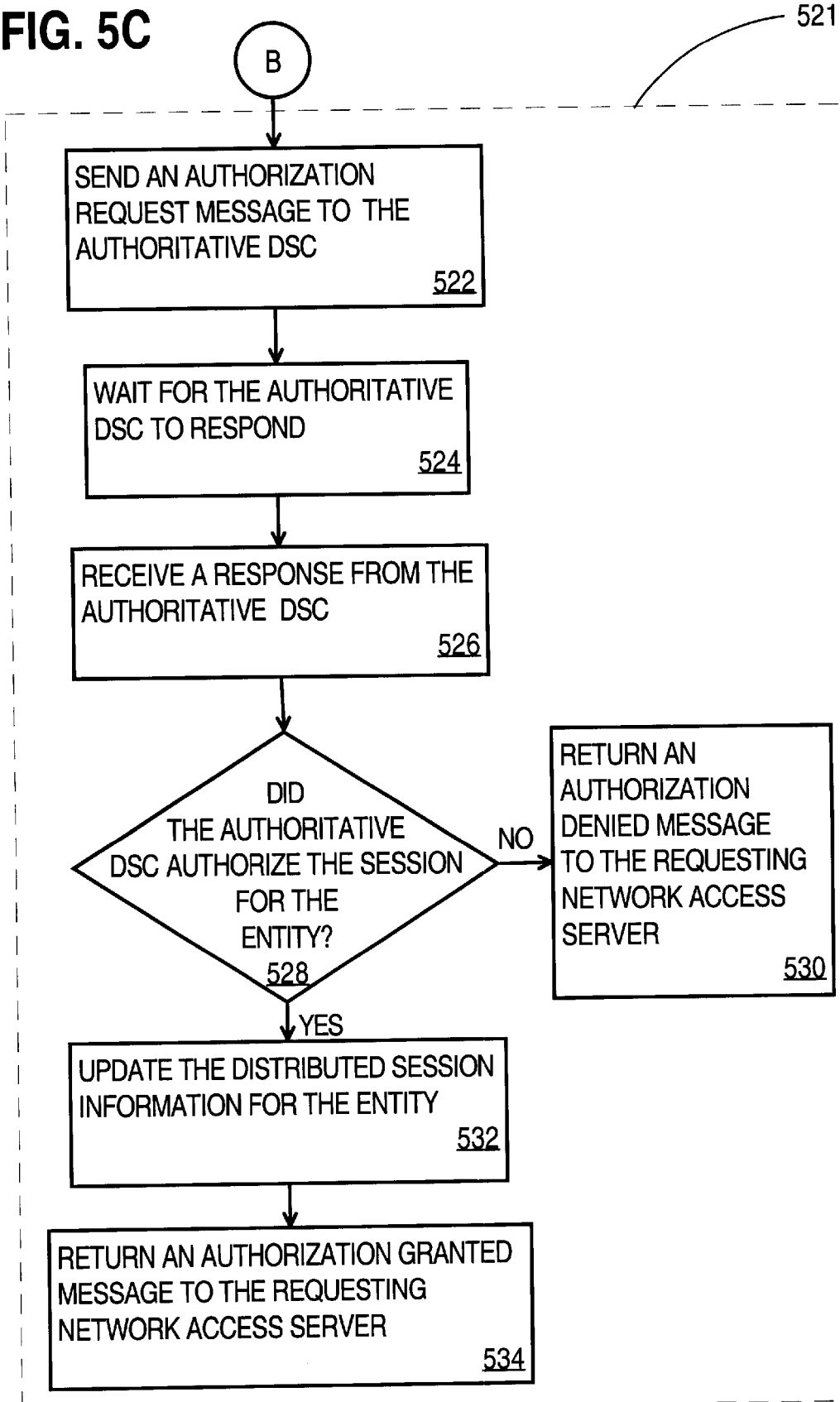
FIG. 5C is a flow diagram that illustrates further steps in the method of FIG. 5A.

FIG. 4 is a block diagram of a system 400 that illustrates a distributed authorization mechanism that may regulate the number of sessions that are established for a particular entity.

System 400 includes users 402 and 404, clients 403 and 405, network access servers 406 and 408, local DSCs 410 and 414 and an authoritative DSC 414. In this example, users 402 and 404 are both employed by an entity known as "COMPANY A". Thus, system 400 has the same general configuration as system 100 of FIG. 1A, FIG. 1B.

Respectively associated with DSCs 410, 412 and 414 are connection data storage areas 416, 418 and 420. In one embodiment, connection data storage areas 416, 418 and 420 are respectively contained in DSCs 410, 412 and 414, as shown in FIG. 3. However, in an alternate embodiment, connection data storage areas 416, 418 and 420 may be maintained separately from one or more of DSCs 410, 412 and 414. In one embodiment, DSCs 410, 412 and 414 may respectively access connection data storage areas 416, 418 and 420 over an internal or external network.

Connection data storage areas 416 and 418 include local distributed session information that is respectively used by local DSCs 410 and 412 to determine if a particular connection request can be authorized locally (FAST LANE) or whether they must request authorization from the authoritative DSC 414 (SLOW LANE). In this example, the local distributed session information in connection data storage area 416 includes a local entity 422 entry for "COMPANY A". For simplicity, this example assumes that a maximum of three (3) local sessions may be established by NAS 406. Therefore, associated with the local entity 422 entry for "COMPANY A" is a local session threshold variable 424 having a value of "3", a local session counter variable 426 that is initially set to "−1" and an authoritative DSC variable 428 that is initially set to "NULL".

Similarly, the local distributed session information in connection data storage area 418 includes a local entity 430 entry for "COMPANY A". Also for simplicity, this example assumes that a maximum of two (2) local sessions may be established by NAS 408. Associated with the local entity 430 entry for "COMPANY A" is a local session threshold variable 432 that equals "2", a local session counter variable 434 that is initially set to "−1" and an authoritative DSC variable 436 that is initially set to "NULL". In certain embodiments, the local session threshold parameters 424 and 432 may be set and adjusted to provide improved system response times while still regulating the number of sessions that are allowed for a particular entity. Although this example illustrates local session threshold variables 424 and 432 having different threshold values, in a preferred embodiment, the local session threshold variables that are associated with a particular entity are all set to the same value within each DSC.

Connection data storage area 420 includes global distributed session information that is used by authoritative DSC 414 to determine whether a particular connection request should be authorized and to distribute global session information to the local DSCs 410 and 412. As depicted, connection data storage area 420 includes an authoritative entity 438 entry for the entity "COMPANY A". Assume that a maximum of 10 sessions are authorized for system 400. Associated with the authoritative entity 438 entry for "COMPANY A" is a global session threshold variable 440 that is currently set to "10", a global session counter variable 442 that is initially set to "−1" and a local DSC list 444 that is initially set to "NULL".

In one embodiment, a global storage area (not shown), that is accessible by the DSCs 410, 412 and 414, contains data that maps a particular authoritative DSC to each entity. The global storage area may be used by DSCs to identify an authoritative DSC associated with a particular entity.

In the example of FIG. 4, at state 1, user 404 interacts with client 405 to dial into network access server 408 to request a connection for the entity COMPANY A. At state 2, network access server 408 communicates with local DSC 412 to request authorization to establish a session for COMPANY A. Upon receiving the authorization request, at state 3, local DSC 412 interfaces with connection data storage area 418 to determine the values of local session threshold variable 432, local session counter variable 434, and authoritative DSC parameter 436.

In this example, local DSC 412 determines that, for COMPANY A, local session threshold variable 432 is currently set to "2", authoritative DSC variable 436 is set to "NULL", and local session counter is currently set to "−1." Accordingly, local DSC 412 determines that a counter has not yet been established for COMPANY A in connection with data storage area 418. Therefore, a SLOW LANE authorization communication sequence is required. At state 4, local DSC 412 identifies DSC 414 as being the authoritative DSC for COMPANY A and then sends an authorization request message to the authoritative DSC 414 requesting authorization for establishing a session for COMPANY A.

In one embodiment, local DSC 412 interfaces with a global storage area (not shown), to determine that DSC 414 is assigned as the authoritative DSC for COMPANY A. Local DSC 412 then stores a value that identifies DSC 414 in authoritative DSC variable 436. To illustrate this, FIG. 4 shows that authoritative DSC variable 436 is set equal to "DSC 414".

At state 5, upon receiving the authorization request message from local DSC 412, authoritative DSC 414 interfaces with connection data storage area 420 to retrieve the values of the global session threshold variable 440 and global session counter variable 442. Using these values, authoritative DSC 414 may respectively determine the total number of sessions that allowed for COMPANY A and the total number of sessions that are currently established for COMPANY A. The authoritative DSC 414 then compares the value of the global session threshold parameter 440 with the value of the global session counter parameter 442 to determine whether a new session should be authorized. In this example, assume that the global session threshold variable 440 equals "10" and the global session counter parameter 442 is currently equal to "NULL". Thus, at state 6, authoritative DSC 414 determines that the session should be authorized and therefore causes the global session counter parameter 442 to be updated to "1".

The authoritative DSC 414 then determines whether local DSC 412 is included in local DSC list 444 in connection data storage area 420. In this example, because the local DSC 412 has not previously requested authoritative DSC 414 to authorize a session for COMPANY A, the local DSC list 444 does not currently include a reference to local DSC 412. Thus, at state 7, authoritative DSC 414 causes local DSC 412 to be added to the local DSC list 444 within connection data storage area 420.

At state 8 authoritative DSC 414 returns an Authorization Granted message back to the local DSC 412. In addition, authoritative DSC 414 uses local DSC list 444 to determine which, if any, DSCs need to be informed of the new current number of sessions that have been authorized for COMPANY A. In one embodiment, a broadcast message with the new current number of sessions is sent to the local DSC that sent the authorization request message. For example, either before or after sending the authorization granted message back to the local DSC 412, the authoritative DSC 414 may broadcast the new current number of sessions to local DSC 412.

In another embodiment, the DSCs that receive the new current number of sessions do not include the local DSC that sent the authorization request message. Instead, the new current number of sessions is included in the authorization granted message that is returned to the local DSC that sent the authorization request message. For example, the Authorization Granted message returned to local DSC 412 in state 8 may include the new current number of sessions for COMPANY A.

At state 9, local DSC 412 causes local session counter 434 in connection data storage area 418 to be updated from "NULL" to "1" to reflect a new current number of sessions for COMPANY A. At state 10, local DSC 412 sends a message to network access server 408 indicating that the session can be established with COMPANY A. At state 11, user 404 interfaces with client 405 to dial into network access server 408 to request that a second connection be established for the entity COMPANY A.

At state 12, the network access server 408 communicates with local DSC 412 to request authorization to establish another session for COMPANY A. Upon receiving the authorization request, at state 13, local DSC 412 interfaces with connection data storage area 418 to determine the values of local session threshold variable 432, local session counter variable 434, and authoritative DSC variable 436.

In this example, local DSC 412 determines that local session threshold variable 432 is currently set to "2", authoritative DSC variable 436 is set to "DSC 414", and local session counter variable 434 is set to "1". Local DSC 412 then compares the value of local session threshold variable 432 with the value of local session counter variable 434. In this case, because the value of local session counter variable 434 ("1") is less than or equal to the value of the local session threshold variable 432 ("2") a FAST LANE authorization communication sequence can be performed. Therefore, at state 14, local DSC 412 causes local session counter variable 434 to be updated from "1" to "2" to reflect a new current number of sessions for COMPANY A.

At state 15, local DSC 412 sends a message to network access server 408 indicating that the session can be established with COMPANY A. At state 16, local DSC 412 sends an authorization update message to authoritative DSC 414 indicating that a session has been authorized for COMPANY A.

At state 17, upon receiving the authorization update message from local DSC 412, authoritative DSC 414 causes the global session counter variable 442 values in connection data storage area 420 to be updated to reflect the authorization of another session for COMPANY A. In this example, the value of global session counter variable 442 is set to "2". At state 18, authoritative DSC 414 sends a reply message back to local DSC 412 indicating that the authorization update message was received and that the global session counter variable 442 has been updated to "2".

At state 19, user 402 interfaces with client 403 to dial into network access server 406 to request that a connection be established for COMPANY A. At state 20, network access server 406 communicates with local DSC 410 to request authorization to establish a session for COMPANY A. Upon receiving the authorization request, at state 21, local DSC 410 interfaces with connection data storage area 416 to determine the values of local session threshold variable 424, local session counter variable 426, and authoritative DSC variable 428. In one embodiment, local DSC 410 interfaces with a global storage area (not shown), that maps a particular authoritative DSC to each entity. In this example, local DSC 410 determines that COMPANY A is mapped to authoritative DSC 414 and therefore updates authoritative DSC variable 428 in connection data storage area 416 to "DSC 414".

In addition, local DSC 410 determines that for COMPANY A, local session threshold variable 424 is currently set to "3" and that local session counter is currently set to "−1", thus indicating that a counter has not yet been established for COMPANY A in connection data storage area 416. Because a counter has not yet been established for COMPANY A, a SLOW LANE authorization communication sequence is carried out. Therefore, at state 22, local DSC 410 sends an authorization request message to the authoritative DSC 414 requesting authorization for establishing a session for COMPANY A.

At state 23, upon receiving the request from local DSC 410, authoritative DSC 414 retrieves values of global session threshold variable 440 and global session counter variable 442 from connection data storage area 420. These values enable authoritative DSC 414 to respectively determine the total number of sessions that allowed for COMPANY A and the total number of sessions that are currently established for COMPANY A. Authoritative DSC 414 then compares the value of global session threshold variable 440 with the value of global session counter variable 442 to determine whether the session should be authorized. In this example, the global session threshold variable 440 currently equals "10" and the global session counter variable 442 is currently equal to "2". Thus, at state 24, authoritative DSC 414 determines that a new session should be authorized and therefore causes the global session counter variable 442 to be set to a value of "3".

The authoritative DSC 414 then determines whether the local DSC 410 is included in local DSC list 444. In this example, because local DSC 410 has not previously sent a request to authoritative DSC 414 to authorize a session for COMPANY A, local DSC list 444 does not currently include a reference to local DSC 410. Thus, at state 25, authoritative DSC 414 causes a value identifying local DSC 410 to be added to local DSC list 444. At state 26, authoritative DSC 414 broadcasts a message that contains the updated global session counter variable 442 value to the DSCs referenced in DSC list 444. In this example, the DSC 414 broadcasts a message containing a value of "3" to DSC 412 and to DSC 410.

At state 27, upon receiving the broadcast message, local DSC 412 updates local session counter variable 434 to reflect the updated value ("3") of global session counter 442. At state 28, an Authorization Granted message is sent to local DSC 410, with the updated value of global session counter variable 442 value for COMPANY A. At state 29, local DSC 410 causes local session counter variable 426 to be set to "3" to reflect the new current number of sessions for COMPANY A. At state 30, the local DSC 410 sends a message to network access server 406 indicating that the session can be established for COMPANY A.

Responding to a Connection Request

FIG. 5A, FIG. 5B, FIG. 5C and FIG. 5D are flow diagrams that illustrate a method for authorizing connection requests in the foregoing context. The steps of FIG. 5A, FIG. 5B, FIG. 5C and FIG. 5D will be explained with reference to FIG. 4.

At block 502, a connection request is received. For example, a DSC receives a connection request from a network access server, requesting authorization to establish a session for a particular entity. Assume that user 404 interacts with client 405 to dial into network access server 408 to establish a session for the entity "COMPANY_A". Assume further that in response, network access server 408 sends a connection request to local DSC 412 to request authorization to establish a session for COMPANY_A.

At block 504, the entity associated with the connection request is determined. In one embodiment, the received connection request includes information that identifies the particular entity, and the determination is done by the DSC. At block 506, the DSC determines whether a connection request has previously been received for the particular entity. For example, upon receiving the connection request, the local DSC 412 searches the distributed session information in connection data storage area 418 to determine whether an entry for COMPANY_A has previously been entered.

If the DSC determines that a connection request has not previously been received for the particular entity then, control proceeds to block 510. However, if the DSC determines that a connection request has previously been received for the particular entity then, at block 508, the DSC determines whether FAST LANE authorization may be performed to determine whether a session should be authorized. For example, local DSC 412 compares the value of the local session threshold counter 432 with the value of the local session counter 434 to determine whether a FAST LANE authorization can be performed. If at block 508 the DSC determines that a FAST LANE authorization can not be performed then, control proceeds to block 510.

Alternatively, if the DSC determines that a FAST LANE authorization can be performed then, at block 513 a FAST LANE authorization is performed to authorize the session. At block 514, the DSC updates its distributed session information to reflect that an additional session will be established for the particular entity. For example, local DSC 412 increments local session counter 434 in the distributed session information in connection data storage area 418 to indicate an additional session has been authorized for COMPANY_A.

At block 515, the DSC returns an authorization granted message to the requesting network access server to indicate a session may be established with the particular entity. The network access server may then perform the necessary functions to establish the session for the particular entity. For example, local DSC 412 returns an authorization granted message to the network access server 408, to indicate a session could be established with COMPANY_A. The network access server 408 then performs the necessary functions to establish a session with the client 405 for COMPANY_A.

At block 516, the DSC identifies the authoritative DSC that is assigned to the particular entity. In one embodiment, a global database that is accessible by the different DSCs contains a mapping that identifies the authoritative DSC that is assigned to a particular entity. Thus, by communicating with the global database, the DSC can identify the authoritative DSC that is assigned to the particular entity.

At block 517, the DSC determines whether it is the authoritative DSC assigned to the particular entity. If the DSC determines that it is not the assigned authoritative DSC for the particular entity then, at block 520, the DSC sends an update message to the assigned authoritative DSC to indicate that the DSC has authorized a session to be established for the particular entity. For example, if local DSC 412 determines that authoritative DSC 414 is the authoritative DSC assigned to COMPANY_A, local DSC 412 sends an update message to authoritative DSC 414 to indicate that a session has been authorized for COMPANY_A.

The DSC may determine, at block 517, that it is the assigned authoritative DSC for the particular entity. In that case, at block 518, the DSC updates the global session information in its connection data storage area to reflect that an additional session will be established. The DSC functions, in effect, as the assigned authoritative DSC for the entity.

At block 519, the DSC identifies the other DSCs that have previously sent an authorization request for the particular entity and broadcasts the update to the identified DSCs. Upon receiving the update, the identified DSCs update their own distributed session information to reflect the received updates. For example, assuming local DSC 412 is the assigned authoritative DSC for COMPANY_A, local DSC 412 uses the local DSC list in the global session information in its connection data storage area 418 to identify the DSCs for broadcasting. The local DSC 412 then broadcasts an update message that contains the updated information to each of the identified DSCs.

At step 510, the DSC identifies the authoritative DSC that is assigned to the particular entity. In one embodiment, a global database that is accessible by the different DSCs contains a mapping that identifies the authoritative DSC that is assigned to a particular entity. Thus, by communicating with the global database, the DSC can identify the authoritative DSC that is assigned to the particular entity. In addition to identifying the authoritative DSC that is assigned to a particular entity, the global database may also include user profile information. For example, the global database may include user profile information that associates a single entity, such as "John", with a group entity, such as "COMPANY_A". In certain embodiments, each DSC maintains its own local copy of some or all of the information that is maintained in the global database. In this context, known database replication technology is used to replicate the information to each local copy.

At block 512, the DSC determines whether it is the authoritative DSC assigned to the particular entity. If at block 512 the DSC determines that it is the assigned authoritative DSC for the particular entity then, control proceeds to block 536. However, if at block 512 the DSC determines that it is not the assigned authoritative DSC for the particular entity then, at block 521, a SLOW LANE authorization is performed.

At block 522, the DSC sends an authorization request message to the assigned authoritative DSC requesting authorization for establishing a session for the particular entity. For example, local DSC 412 sends an authorization message to authoritative DSC 414 requesting authorization for establishing a session for COMPANY_A. At step 524, the DSC waits for the assigned authoritative DSC to respond to its authorization message. Many factors may effect the amount of time that it takes for a response to be received back from the assigned authoritative DSC. In one embodiment, the DSC uses a timer that signals the DSC after a particular amount of time has elapsed. In certain embodiments, the DSC uses the timer to indicate the message may have been lost and that the authorization request message should be resent to the assigned authoritative DSC.

At block 526, a response from the assigned authoritative DSC is received at the DSC. At block 528, based on the response from the assigned authoritative DSC, the DSC determines whether a session should be established. If at block 528 the DSC determine that a session should not be established, at block 530, the DSC returns an Authorization Denied message to the requesting network access server to indicate that a session should not be established for the particular entity. For example, upon receiving a response from authoritative DSC 414 that indicates a session should not be established for the entity COMPANY_A, local DSC 412 returns an Authorization Denied message to network access server 408.

However, if at block 528 the DSC determines that a session should be established, then at block 532, the DSC updates its distributed session information to reflect that an additional session will be established. For example, local DSC 412 increments local session counter 434 to indicate an additional session is authorized for COMPANY_A.

At block 534, the DSC returns an Authorization Granted message to the requesting network access server to indicate a session may be established with the particular entity. The network access server may then perform the necessary functions to establish the session for the particular entity. At block 536, the DSC, functioning as the assigned authoritative DSC for the particular entity, determines whether a session should be established for the particular entity. In one embodiment, to determine whether a session should be established for the particular entity, the DSC compares the value of the global session threshold with the value of the global session counter, for the particular entity. If the value of the global session threshold is less than or equal to the value of the global session counter, the DSC determines that a session should not be established for the particular entity. However, if the value of the global session threshold is greater than the value of the global session counter, the DSC determines that a session should be established for the particular entity.

If at block 536 the DSC determines that a session should not be established for the particular entity, then at block 538 the DSC returns an Authorization Denied message to the requesting network access server to indicate that a session should not be established for the particular entity. However, at block 536 the DSC may determine that a session should be established. In that case, at block 540, the DSC updates the global session information to reflect that an additional session will be established for the particular entity. In this respect, the DSC functions as the assigned authoritative DSC for the entity.

At block 542, the DSC updates its distributed session information to reflect that an additional session will be established. For example, local DSC 412 increments local session counter 434 in the distributed session information in connection data storage area 418. At block 544, the DSC returns an Authorization Granted message to the requesting network access server, indicating that a session may be established with the entity. The network access server may then perform functions necessary to establish the session. For example, local DSC 412 returns an Authorization Granted message to network access server 408 to indicate a session may be established with COMPANY_A. Network access server 408 then establishes a session with client 405 for COMPANY_A.

At block 546, the DSC identifies the other DSCs that have previously sent an authorization request for the entity, and broadcasts the update to those DSCs. Upon receiving the update, the DSCs update their own distributed session information to reflect the received updates. For example, assuming local DSC 412 is the assigned authoritative DSC for the entity COMPANY_A, local DSC 412 uses the local DSC list in the global session information in its connection data storage area 418 to identify the DSCs for broadcasting. Local DSC 412 then broadcasts an update message that contains the updated information to each of the identified DSCs.

Responding to an Authorization Request

Figure 6:
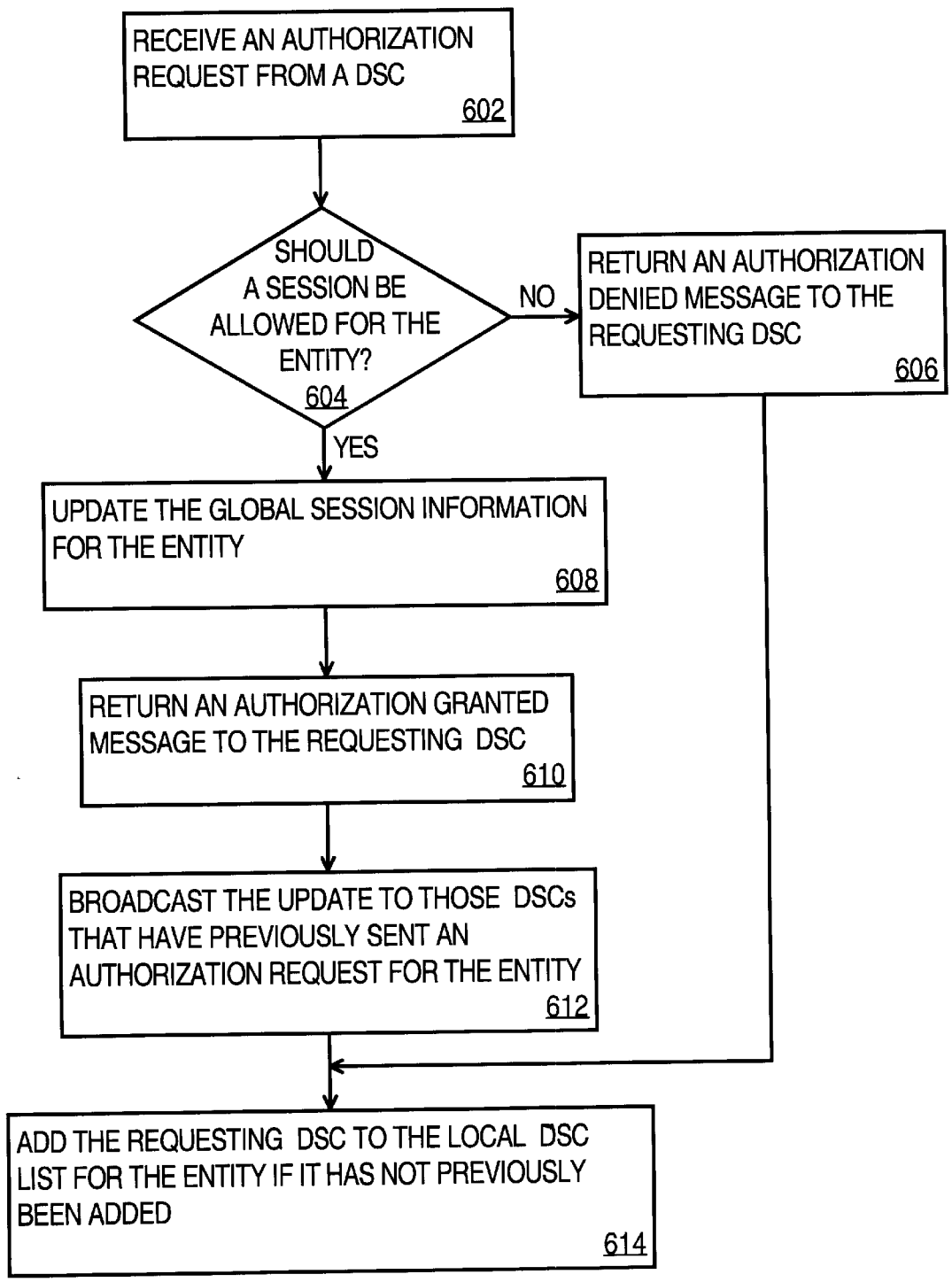
FIG. 6 is flow a diagram that illustrates a method for responding to authorization requests sent by a distributed session counter.

FIG. 6 is flow a diagram that illustrates a method for responding to authorization requests sent by a DSC in the foregoing context. The steps of FIG. 6 are explained with reference to FIG. 4.

At block 602, an authorization request is received from a DSC. For example, an authorization request is received at an authoritative DSC from a local DSC requesting authorization to establish a session for a particular entity. Assume that an authorization request is received at authoritative DSC 414 from local DSC 412 requesting authorization to establish a session for the entity "COMPANY_A". Assume also that authoritative DSC 414 has been assigned as the authoritative DSC for COMPANY_A.

At block 604, the authoritative DSC for the entity determines whether a session should be established. In one embodiment, the authoritative DSC compares the value of the global session threshold with the value of the global session counter, for the particular entity. For example, upon receiving an authorization request from local DSC 412 for COMPANY_A, authoritative DSC 414 compares the value of global session threshold 440 with global session counter 420, for the entity, maintained in the global session information in connection data storage area 420. If the value of the global session threshold 440 is less than or equal to the value of the global session counter 442, then a session should not be established for COMPANY_A. However, if the authoritative DSC 414 determines that the value of global session threshold 440 is greater than global session counter 442, then a session should be established for COMPANY_A.

If at block 604 the authoritative DSC determines that a session should not be established, then at block 606, the authoritative DSC returns an Authorization Denied message to the requesting local DSC to indicate that a session should not be established. For example, in response to determining that a session should not be established for COMPANY_A, authoritative DSC 414 returns an Authorization Denied message to local DSC 412 indicating that a session should not be established for the entity COMPANY_A. Control then proceeds to block 614.

However, if the authoritative DSC determines that a session should be established for the particular entity, then at block 608 the authoritative DSC updates the global session information in its connection data storage area to show that an additional session will be established for the particular entity. For example, in response to determining that a session may be established for COMPANY_A, authoritative DSC 414 updates global session counter 442 to reflect that a session will be established for COMPANY_A.

At block 610, the authoritative DSC returns an Authorization Granted message to the requesting local DSC to indicate that a session can be established with the particular entity. For example, authoritative DSC 414 returns an Authorization Granted message to local DSC 412 indicating that a session can be established for COMPANY_A.

At block 612, the authoritative DSC identifies the other DSCs that have previously sent an authorization request for COMPANY_A and broadcasts the update to those DSCs. Upon receiving the update, the identified DSCs update their own distributed session information to reflect the received update. In one embodiment, the authoritative DSC uses a local DSC list that is maintained in the global session information in its connection data storage area to identify the DSCs for broadcasting. For example, assuming that local DSC 410 had previously sent an authorization request to authoritative DSC 414 for the entity COMPANY_A, in searching local DSC list 444, authoritative DSC 414 identifies local DSC 410 for broadcasting. The authoritative DSC 414 then broadcasts to local DSC 410 the updates that are maintained in the global session information in connection data storage area 420 for entity COMPANY_A. Upon receiving the update, the local DSC 410 causes its own distributed session information to reflect the received updates At block 614, if the authorization request message represents the first authorization request that was sent by the local DSC for the particular entity, then the authoritative DSC updates the global session information in its connection data storage area. The updates indicate that changes to the global session information for the particular entity should be broadcast to the local DSC. For example, if the authorization request message is the first authorization request sent by local DSC 412 for COMPANY_A, then authoritative DSC 414 updates local DSC list 444 to include an entry for DSC 412.

Terminating Sessions

In one embodiment, when a session terminates, a network access server sends a connection termination message to a DSC to indicate that a session for a particular entity terminated. In one embodiment, the network access server maintains a record that indicates, for each session, the particular DSC that authorized the session for the entity. In certain embodiments, the network access server uses the record to send the connection termination message to the same DSC that authorized the terminated session. In another embodiment, the network access server selects a DSC other than the one that authorized the terminated session for sending the connection termination message.

Upon receiving a connection termination message, the DSC identifies the authoritative DSC assigned to the particular entity. If the DSC determines that itself is the authoritative DSC assigned to the entity, it updates the global session information in its connection data storage area to reflect termination of the session. The DSC then identifies the other DSCs that previously sent an authorization request for the particular entity and broadcasts the update to the identified DSCs. Upon receiving the broadcast update, the identified DSCs update their own distributed session information to reflect that the session terminated.

However, if the DSC determines that it is not the authoritative DSC assigned to the entity, the DSC sends a session termination message to the authoritative DSC that is assigned to the entity. In response, the authoritative DSC updates the global session information in its connection data storage area to reflect the termination of the session for the particular entity. The authoritative DSC then identifies the other DSCs that previously sent an authorization request for the particular entity and broadcasts the update to those DSCs. Upon receiving the broadcast update, those DSCs update their own distributed session information.

Multiple User Entities

In certain embodiments, a particular user may be associated with more than one entity. For example, a user by the name of "John" who works in the "Engineering Department" of "COMPANY A" may be associated with three entities (a client computer named John, the Engineering Department, and COMPANY A). Each entity is assigned a separate global session threshold value that defines the maximum number of sessions that may be established for an entity at a time. For example, client computer John may be assigned a global session threshold value of "5"; the Engineering Department may be assigned a global session threshold value of "100"; and COMPANY A may be assigned a global session threshold value of "1000".

Figure 7:
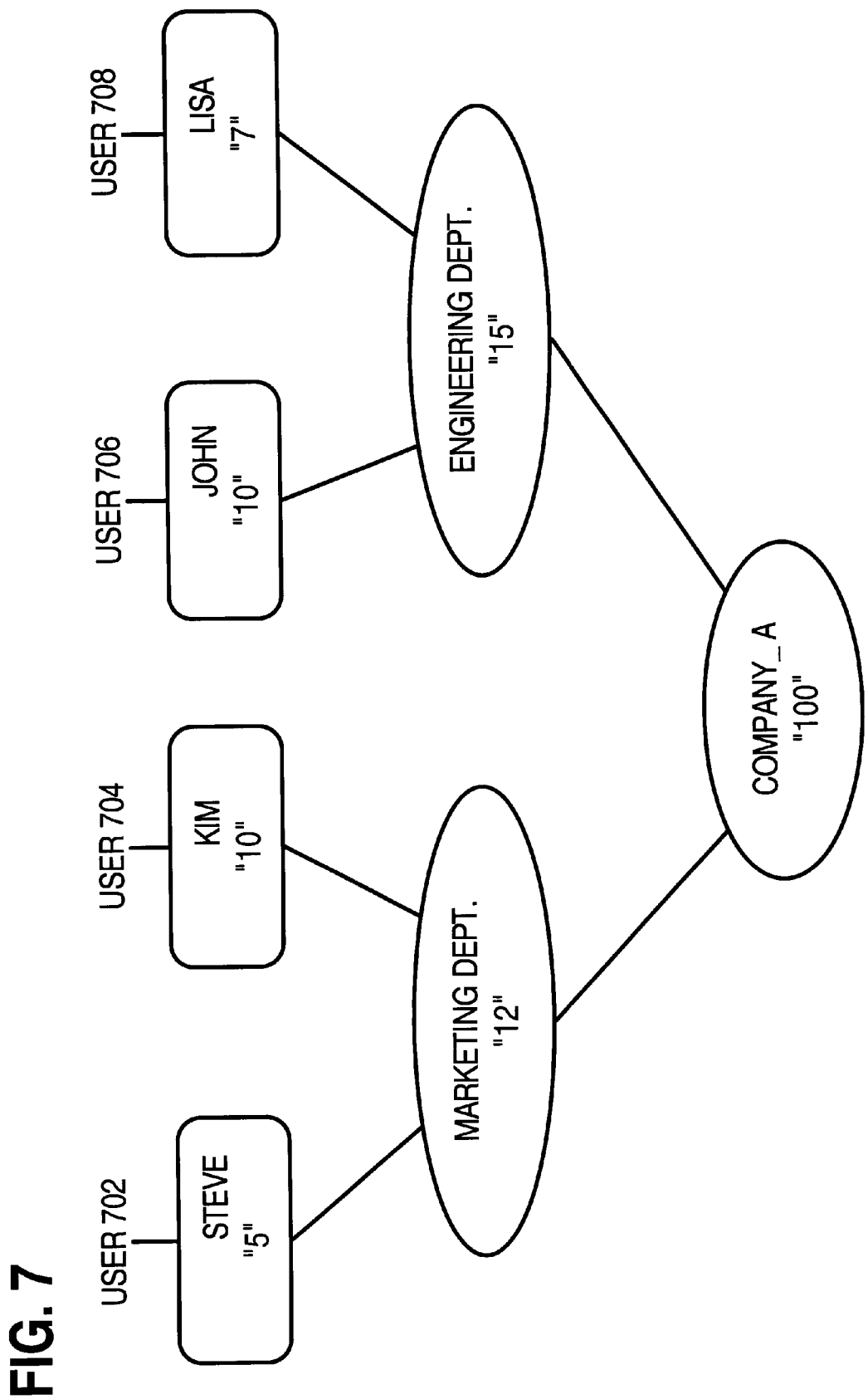
FIG. 7 illustrates a multi-level authorization mechanism that may be used to control the number of sessions that are concurrently active for a particular user.

FIG. 7 illustrates an example of a multi-level authorization mechanism 700 that may be used to control the number of sessions that are concurrently active for a particular user. In this example, COMPANY_A is assigned a global session threshold value of "100". Marketing Department and Engineering Department of COMPANY_A are respectively assigned global session threshold values of "12" and "15". Steve and the Kim, which are client computers associated with employees in the Marketing Department of COMPANY_A, are respectively assigned global session threshold values of "5" and "10". John and Lisa, which represent client computers associated with employees in the Engineering Department, have global session threshold values of "10" and "7".

In one embodiment, the global session threshold values that are assigned to entities, and that are associated with a particular user, are used as a multi-level authorization mechanism to determine whether a session should authorized for the particular user. For example, the user 706 is associated with the entities John, Engineering Department and COMPANY_A. Therefore, to determine whether a session should be authorized for user 706, the number of sessions that are currently active for the entities John, Marketing Department and COMPANY_A must be determined and compared against their respective global session threshold values. If the number of currently active sessions for any of the entities John, Marketing Department or COMPANY_A is greater than or equal to their respective global session threshold values, then authorization is denied.

For example, if COMPANY_A currently has 50 active sessions, the entity Engineering Department currently has 10 sessions and the entity John has 5 sessions, then a request to establish a session for user 706 will be authorized. Authorization will be granted because the number of sessions that are currently active for each entity is less than each respective global session threshold value. However, if COMPANY_A currently has 50 active sessions, Engineering Department has 15 active sessions and John has 0 sessions, then a request to establish a session for user 706 will not be authorized. Authorization is denied because at least one entity, the Engineering Department, currently has its maximum number of sessions.

Distributing Multiple User Entities

In one embodiment, multiple entities that are associated with a particular user are each assigned an authoritative DSC. In certain embodiments, the entities associated with a particular user may be assigned the same authoritative DSC or assigned to different authoritative DSCs. For each entity, the authoritative DSC that is assigned maintains global session information for the particular entity.

Figure 8:
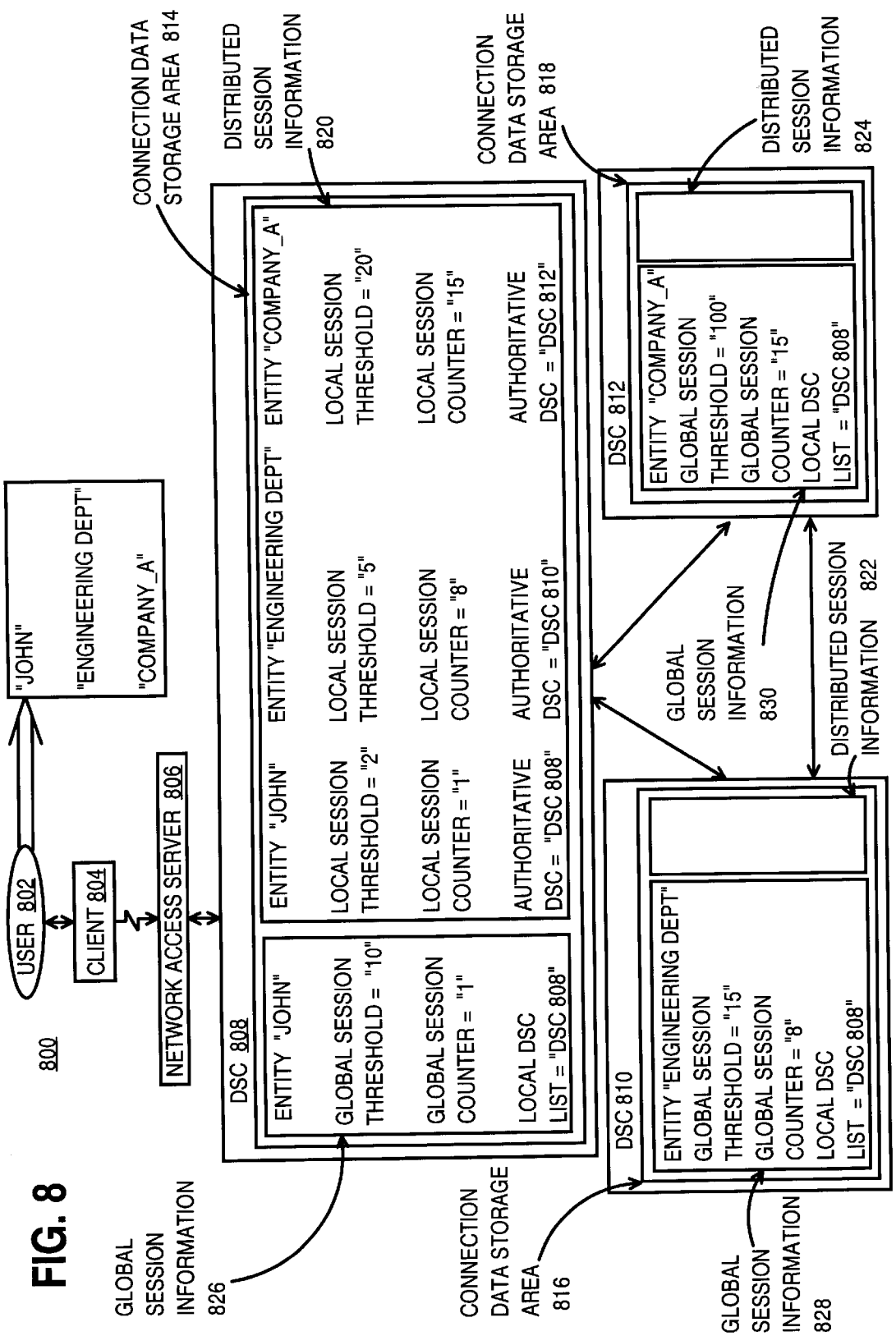
FIG. 8 illustrates a distributed authorization system in which a user is associated with multiple entities.

FIG. 8 illustrates a distributed authorization system 800 in which a user 802 is associated with three entities (John, Engineering Department, and COMPANY_A). In this example, DSC 808 is assigned as the authoritative DSC for John; DSC 810 is assigned as the authoritative DSC for Engineering Department; and DSC 812 is assigned as the authoritative DSC for COMPANY_A. DSC 808 maintains global session information 826 in connection data storage area 814 for John; DSC 810 maintains global session information 828 in connection data storage area 816 for Engineering Department; and DSC 812 maintains global session information 830 in connection data storage area 818 for COMPANY_A.

For purposes of this example, assume:
1. Global session information 826 stores the values: Global session threshold="10"; global session counter="1": local DSC list="DSC 808".
2. Distributed session information 820 stores the values shown in Table 4:

TABLE 4

DISTRIBUTED SESSION INFORMATION 820 VALUES

| ENTITY | LOCAL SESSION THRESHOLD | LOCAL SESSION COUNTER | AUTHORITATIVE DSC |
|---|---|---|---|
| JOHN | 2 | 1 | DSC 808 |
| ENGINEERING DEPT | 5 | 1 | DSC 810 |
| COMPANY_A | 20 | 15 | DSC 812 |

3. Global session information 828 stores the values: Entity="Engineering Department"; global session threshold=15; global session counter=8; local DSC list="DSC 808".
4. Global session information 830 stores the values: Entity="COMPANY_A"; global session threshold="100"; global session country=15; local DSC list="DSC 808".

User 802 interacts with client 804 to dial into network access server 806 to request the NAS to establish a session. In response, NAS 806 sends a connection request to DSC 808 requesting authorization to establish a session. In a preferred embodiment, a local database, as previously described, is associated with the DSC 808 and contains information that identifies the request as being associated with John, Engineering Department and COMPANY_A. In certain embodiments, the network access server 806 may include information that identifies the request as associated with John, Engineering Department and COMPANY_A. Upon receiving the request, the DSC 808 determines whether a FAST LANE authorization may be performed on a per entity basis.

For example, in receiving the request, the DSC 808 determines whether a FAST LANE authorization may be performed for John. As described in connection with FIG. 4, DSC 808 stores distributed session information 820 for determining whether a FAST LANE authorization sequence can be performed. In this example, for John, the local session counter value is "1" and the local session threshold value is "2", so that DSC 808 determines that a FAST LANE authorization sequence can be performed. In addition, because DSC 808 is assigned as the authoritative DSC for John, DSC 808 may itself determine whether a session should be authorized for John even if a FAST LANE authorization sequence could not be performed.

Alternatively, for Engineering Department, because the local session counter value equals "8" and the local session threshold value equals "5", the DSC 808 determines that a SLOW LANE authorization sequence must be performed. In this case, the DSC 808 identifies DSC 810 as the authoritative DSC for Engineering Department and initiates a SLOW LANE authorization sequence by sending a connection request for Engineering Department to DSC 810.

However, for COMPANY_A, the local session counter value is "15" and the local session threshold value equals "20". Therefore, DSC 808 determines that a FAST LANE authorization sequence can be performed. DSC 808 identifies DSC 812 as the authoritative DSC for Company A and initiates a Fast Lane authorization sequence.

Based on whether a session can be authorized for each of the entities, DSC 808 determines whether an Authorization Granted or an Authorization Denied message should be sent to network access server 806. In one embodiment, if DSC 808 determines that a session can be authorized for each entity, DSC 808 returns an Authorization Granted message to network access server 806 to indicate that a session for user 802 may be established. Alternatively, if DSC 808 determines that a session cannot be authorized for one or more of the entities, the DSC 808 returns an Authorization Denied message to network access server 806 to indicate that a session should not be established. In one embodiment, DSC 808 returns an Authorization Denied message to network access server 806 immediately after determining that a session cannot be authorized for one of the entities. Thus, DSC 808 is not required to wait for every authoritative DSC to respond to before returning an authorization denied message to network access server 806 once it is determined that a session cannot be authorized for an entity.

In certain embodiments, if a DSC determines that a session cannot be granted, the DSC must inform any authoritative DSC that authorized the session for a particular entity that was associated with the request. Once notified, the authoritative DSCs may then update the global session counter that is associated with the entity to reflect that a session could not be established. For example, In a preferred embodiment, a local database, as previously described, is associated with the DSC 808 and contains information that identifies the request as being associated with John, Engineering Department and COMPANY_A. In certain embodiments, the network access server 806 may include information that identifies the request as associated with John, Engineering Department and COMPANY_A. Upon receiving the request, the DSC 808 determines whether a FAST LANE authorization may be performed on a per entity basis.

For example, assume that DSC 808 receives a request from network access server 806 to authorize a session for John. Also assume that "15" sessions are currently active for the Engineering Department, thus another session should not be authorized for the Engineering Department. Because John is in the Engineering Department of COMPANY_A, DSC 808 must send an authorization request to both DSC 810 and DSC 812 to respectively request authorization to establish a session for the Engineering Department and the COMPANY_A. In receiving the authorization request from DSC 808, DSC 812 determines that a session can be established for COMPANY_A. DSC then updates its global session counter to indicate that another session has been authorized for COMPANY_A and returns an Authorization Granted message to DSC 808. Alternatively, in receiving the authorization request from DSC 808, DSC 810 determines that a session cannot be established for the Engineering Department and therefore returns an Authorization Denied message to DSC 808. Thus, because the session cannot be established, DSC 808 must notify DSC 812 that the session was not established for COMPANY_A and that global session counter for COMPANY_A should be updated to reflect that the session was not established.

It should be noted that for explanation purposes FIG. 8 depicts connection storage area 814 having connection information for John in both distributed session information 820 and global session information 826. However, because DSC is assigned as the authoritative server for John, connection information for John need only be maintained in global session information 826. Thus, in a preferred embodiment, the connection information that is stored in the DSC that is assigned as the authoritative server for a particular entity is maintained in only the global session information of the DSC.

Hardware Overview

Figure 9:
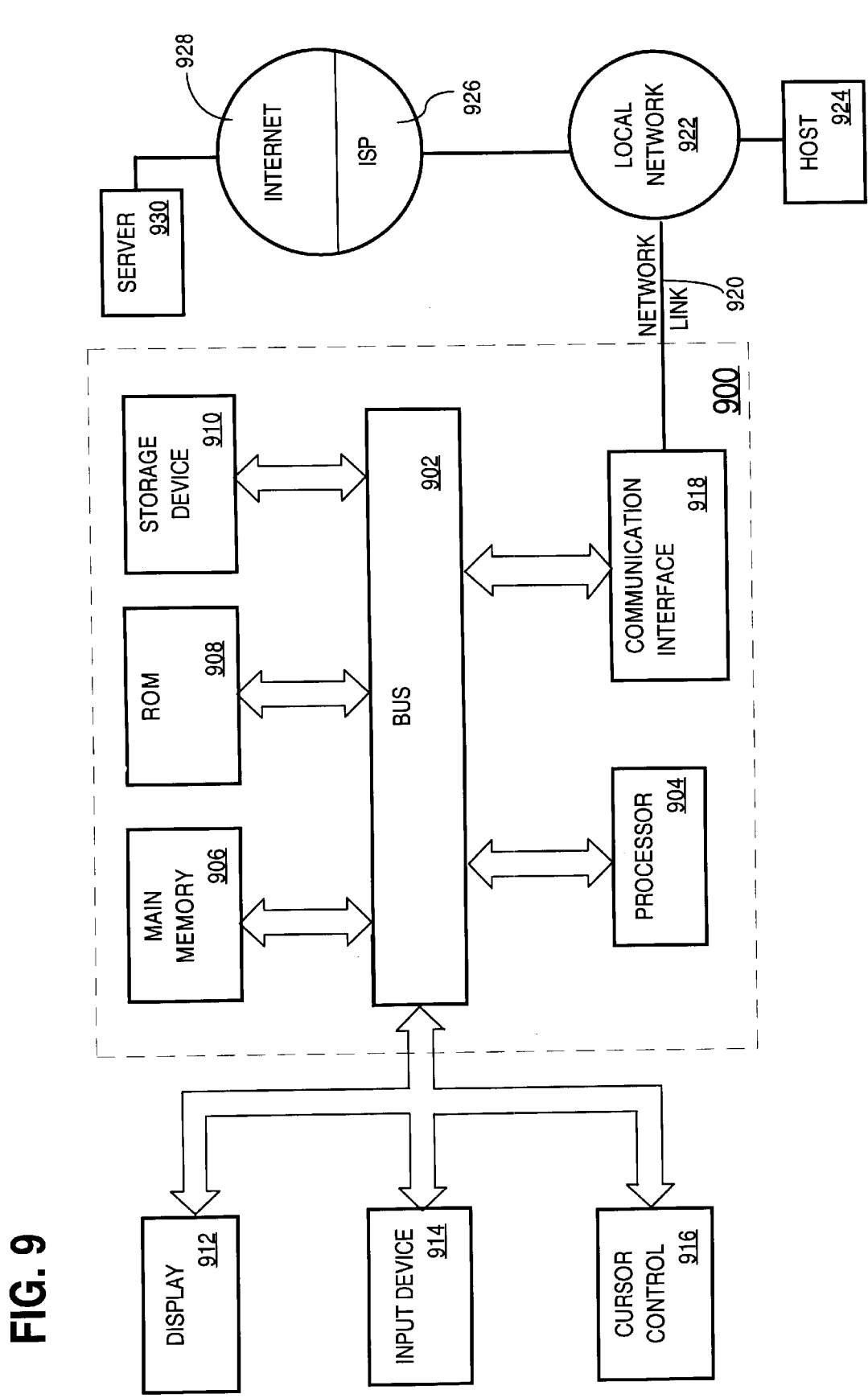
FIG. 9 is a block diagram of a computer system hardware arrangement that can be used to implement aspects of the invention.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for managing the access of a network system using a distributed authorization model. According to one embodiment of the invention, a distributed authorization model is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for managing the access of a network system using a distributed authorization model as described herein.

The received code may be executed by processor 904 as it is received, and/or stored in storage device 910, or other non-volatile storage for later execution. In this manner, computer system 900 may obtain application code in the form of a carrier wave.

Alternatives, Extensions

The FAST LANE/SLOW LANE mechanism that is described herein allows operators to set a threshold above which using cached data in the form of values stored in the local distributed session counters can no longer be considered safe. Thus, the FAST LANE/SLOW LANE technique provides an intuitive control mechanism that allows operators to tune their systems to balance the tradeoffs between speed and accuracy. This technique has applications in many forms of resource allocation, management, and provisioning. It may also have applications in systems that include one or more values that have a definable maximum rate of change.

In describing certain embodiments of the invention, several drawing figures have been used for explanation purposes. However, the invention is not limited to any particular context as shown in drawing figures, and the spirit and scope of the invention include other contexts and applications in which the distributed authorization model described herein is available to other mechanisms, methods, programs, and processes. For example, the network access servers and the DSCs have been illustrated as separate components. However, in certain embodiments of the invention a network access server and a DSC may function as a single unit. For example, referring to FIG. 1A, the functions described for the network access server 104 and the local DSC 108 may be combined into a single unit. Likewise, the functions of authoritative DSC 112 may be combined with the functions of a network access server in a single unit. Thus, the specification and drawings are, accordingly, to be regarded in an illustrative rather than a restrictive sense.

As another example, there is need to maintain both the local session information and the global session information within the same connection storage area. For example, global session information 826 shown in FIG. 8 may be maintained in a connection data storage area that is completely separate from the connection data storage area in which distributed session information 820 is maintained.

In addition, in this disclosure, including in the claims, certain process steps are set forth in a particular order, and alphabetic and alphanumeric labels are used to identify certain steps. Unless specifically state in the disclosure, embodiments of the invention are not limited to any particular order of carrying out such steps. In particular, the labels are used merely for convenient identification of steps, and are not intended to imply, specify or require a particular order of carrying out such steps.

-49-

APPENDIX

Copyright © 1998 Cisco Systems, Inc.

1. Purpose

This document defines the protocol that is to be used between the Max Session Server (MSS) and its clients (e.g. another Max Session Server or the Graphical User Interface (GUI)).

2. Terms

| | |
|---|---|
| AAA | Authentication Authorization Accounting, usually used to refer to a AAA server. |
| GUI | Graphical User Interface. |
| MSS | Max Session Server. |
| TLV | Token Length Value – A scheme in which data is sent as three units, a token, a length of data that represents a related value, and that value. Note that for some tokens, a length (and thus value) is not used. Also, the length may be zero, in which case, no value follows. There are also tokens that have fixed length, in which case, data is sent as 2 units, a token and the value. The length of the value with non-fixed length is a 1 byte field. |

3. Background

The Max Session Server resides in the same box as the AAA server. It communicates with other Max Session Servers and the GUI using the protocol presented in this document. All the sample packets that are shown in ASCII format in this document are for the reader to read and understand the protocol easily. The actual protocol is in binary mode, as shown in section 4.2. Note that before the packet is sent, 2 bytes are added in front of the packet to specify the length of the packet.

4. Grammar

*4.1. Syntax*

4.1.1. Statements

Each command to the MSS comprises one or more statements. These statements may run on, but they must eventually be terminated by a ';' (semicolon). The semicolon is considered a synchronization operator. When a semicolon is encountered, the MSS will complete all output to that client before processing any further input from that client. It will also ensure that the level of nesting is zero and that any incomplete commands are aborted.
- Final Statement =>      <zero or more statements> ;

4.1.2. Nesting

Nesting is accomplished with braces. An open brace increases the level of nesting, and a close brace decreases the level. The level of nesting can never be less than zero. If unmatched close braces are encountered, an error is assumed.
- Nested Statement =>      { <zero or more statements> }

50325-041 - APPENDIX
(WGM 578)

-50-

4.1.3. Setting Statements

A setting command is followed by a value. The format of that value is implied by the setting statement. If the value is an enumeration, it will be expressed as a setting-specific identifier. These words have no meaning other than as a value of a particular type.
- Setting Statement => <Setting Command> <number | string | setting-specific identifier>

4.1.4. Command Statements

A command statement is a statement that requests an action, groups requests, replies to a request, or instantiates a counter. A command statement must be followed by an open brace to increase the level of nesting. When the level of nesting is decreased with a matching close brace, the command statement is completed.
- Command statement =>  <Basic Command> <Nested Statement>
  | <Reply Command> <Nested Statement>
  | <Counter Command> <Nested Statement>

4.2. Protocol

4.2.1. Operators

4.2.1.1. Synchronization (Statement Terminator)
;     0x00     Synchronize.

4.2.1.2. Nesting
{     0x01     Increase level of nesting.
}     0x02     Decrease level of nesting.

4.2.2. Setting Commands

| Name | Code | Value | Description |
|---|---|---|---|
| version_num | 0x21 | <num1> | Set the version number for subsequent releases of the MSS that require protocol changes. |
| sequence_num | 0x22 | <num4> | Set sequence number for subsequent commands that require a reply. |
| nas_name | 0x23 | <string> | Set nas address on reservation, cancel_reservation, activation, and termination request packets. |
| nas_port | 0x24 | <string> | Set nas port on reservation, cancel_reservation, activation, and termination request packets. |
| force_acceptance | 0x25 | <true false enum> | Indicate 'true' for fast lane requests and 'false' for slow lane requests for reservations only. |
| Status | 0x26 | <status enum> | Indicate status for reply - pass or fail. |
| counter_name | 0x27 | <string> | Set counter name. The length can be a maximum of 255 bytes. If the actual name is greater than 255 bytes, we'll only send the first 255 bytes. |
| counter_type | 0x28 | <counter | Set counter type. |

50325-041 - APPENDIX
(WGM 578)

-51-

| name | code | type | description |
|---|---|---|---|
| max_count | 0x29 | <type enum> <num4> | Set maximum count. |
| hp_threshold | 0x2A | <num4> | Set slow/fast threshold in value. |
| reserve_count | 0x2B | <num4> | Set the current reservation count. |
| active_count | 0x2C | <num4> | Set the current activation count. |
| res_nasname | 0x2D | <string> | Set the reservation nas name for synchronization packets only. |
| res_nasport | 0x2E | <string> | Set the reservation nas port for synchronization packets only. |
| act_nasname | 0x2F | <string> | Set the activation nas name for synchronization packets only. |
| act_nasport | 0x30 | <string> | Set the activation nas port for synchronization packets only. |
| numof_rejects | 0x31 | <num4> | Number of rejections of a counter. |
| numof_oversubscribes | 0x32 | <num4> | Number of oversubscriptions of a counter. |
| high_mark | 0x33 | <num4> | High water mark of a counter. |
| res_timeout | 0x34 | <num4> | Reservation timeout in milliseconds. |
| com_timeout | 0x35 | <num4> | Communication timeout in milliseconds. |
| batch_timeout | 0x36 | <num4> | Batch timeout for advertisements in milliseconds. |
| numof_transactions | 0x37 | <num4> | Total number of transactions. |
| alive_time | 0x38 | <num4> | MSS alive time in seconds. |
| last_reset_time | 0x39 | <num4> | Last reset time in seconds. This is used to calculate the number of transactions per seconds within a certain time. |
| reset_global_stats | 0x3A | <true false enum> | if this is set to true, the last_reset_time will be set to current time and numof_transactions will be set to zero. |
| sub_operation | 0x3B | <suboperation enum> | Set the sub-operation for a query request - all, rejects, oversubscribed. |
| last_counter_name | 0x3C | <string> | The name of the counter that the GUI last received from the MSS. |
| last_counter_type | 0x3D | <counter type enum> | The type of the counter that the GUI last received from the MSS. |
| max_counter_return | 0x3E | <num4> | The maximum number of counters that the GUI wants to receive from the MSS. |
| more_indicator | 0x3F | <true false enum> | Set this to true if there are more counters that the GUI can receive from the MSS. |
| invalid_counter | 0x40 | <true false enum> | Indicate whether the counter is still valid or not. If the counter does not exist, set this to 'false'. |
| reset_type | 0x41 | <reset type enum> | Indicate whether to reset just the statistics, the counts, or both in the reset requests. |

50325-041 - APPENDIX
(WGM 578)

-52-

| | | | | |
|---|---|---|---|---|
| hello_type | 0x42 | \<hello type enum\> | Indicate whether the hello packet is sent as a ping or a clear message. |
| state | 0x43 | \<state enum\> | Indicate the state of the nas is up or down. |
| got_count | 0x44 | \<true false enum\> | Indicate whether the counter was processed by the remote MSS or not. |
| counter_handle | 0x45 | \<num4\> | This counter handle is passed to the MSS by the AAA Server/Resource Manager. The MSS has to keep track of this counter handle so that when it returns back to the AAA Server/Resource Manager, the AAA Server/Resource Manager will know which counter to update in the database. |

4.2.2.1.Enumeration for the setting commands

4.2.2.1.1.Counter Types

| | | |
|---|---|---|
| all | 0 | Counter type all. |
| user | 1 | Counter type user. |
| group | 2 | Counter type group. |
| pop | 3 | Counter type pop. |
| user_pop | 4 | Counter type user pop. |
| group_pop | 5 | Counter type group pop. |
| resource | 6 | Counter type resource. |

4.2.2.1.2.Status

| | | |
|---|---|---|
| pass | 0 | Requests granted. |
| fail | 1 | Requests partially or totally denied. |
| no response | 2 | No response from the remote MSS. |
| not reachable | 3 | Remote MSS is not reachable. |

4.2.2.1.3.True False

| | | |
|---|---|---|
| false | 0 | Request type is false. |
| true | 1 | Request type is true. |

4.2.2.1.4.Sub-operation

| | | |
|---|---|---|
| all | 0 | Query request for all counters. |
| rejects | 1 | Query request for counters with number of rejects > 0. |
| oversubscribes | 2 | Query request for counters with number of oversubscriptions > 0. |
| none | 3 | None of the above. |

4.2.2.1.5.Reset Type

| | | |
|---|---|---|
| all | 0 | Reset all counters. |
| counts | 1 | Reset counts only. |
| stats | 2 | Reset stats only. |

50325-041 - APPENDIX
(WGM 578)

-53-

4.2.2.1.6. Hello Type

| | | |
|---|---|---|
| ping | 0 | Send a ping message to confirm the connection. |
| clear | 1 | Send a clear message to inform the remote MSS to clear all the counters established by the local MSS. |

4.2.2.1.7. State Type

| | | |
|---|---|---|
| up | 0 | The Nas is up. |
| down | 1 | The Nas is down. |

4.2.2.2. Data Type

- string - It has a variable length. The first byte is the length of the string and the string begins at the second byte. This is not a null terminated string.
- num1 - a 1 byte number. This value is saved as a binary value in the packet.
- num2 - a 2 byte short integer. This value is saved as a binary value in the packet.
- num4 - a 4 byte long integer. This value is saved as a binary value in the packet.
- enum - enumeration specified in section 4.2.2.1. This value is saved as a binary value in the packet.

4.2.3. Commands

4.2.3.1. Basic Commands

| | | | | |
|---|---|---|---|---|
| reservation { | 0x51 | -- | -- | Opens a reservation context. One or more counters can be instantiated within this context. When the context is closed (i.e. unnested) the reply is formed. |
| cancel_reservation { | 0x52 | -- | -- | Opens a cancel reservation context. This context behaves as a reservation context, except that it releases, rather than acquires, reservations. |
| activation { | 0x53 | -- | -- | Opens an activation context. This context behaves as a reservation context, except that it activates previously acquired reservations. |
| termination { | 0x54 | -- | -- | Opens an termination context. This context behaves as a reservation context, except that it terminates (releases) previously activated reservations. |
| getcounts { | 0x55 | -- | -- | Opens a get counts context. This context queries the current values of counters. This operation is sent from one MSS to another. |
| addNgetcounts { | 0x56 | -- | -- | Opens an add and get counts context. This context behaves as a getcounts context, except that if the counters don't exist, they will be added to the MSS. This operation is sent from one MSS to another. |
| query { | 0x57 | -- | -- | Opens a query context. This context behaves as a reservation context, |

50325-041 - APPENDIX
(WGM 578)

-54-

| | | | | |
|---|---|---|---|---|
| | | | | except that it queries the current values of counters. This operation is sent from a GUI to a MSS. |
| reset { | 0x58 | -- | -- | Opens a reset context. This context behaves as a reservation context, except that it resets the counter statistics to zero, or the counts, or both the counts and statistics. This operation is sent from a GUI to a MSS. |
| get { | 0x59 | -- | -- | Opens a get context. This context gets the current MSS configurable values. This operation is sent from a GUI to a MSS. |
| set { | 0x5A | -- | -- | Opens a set context. This context sets the current MSS configurable values. This operation is sent from a GUI to a MSS. |
| hello { | 0x5B | -- | -- | Opens a hello context. This context triggers the remote MSS to reply to confirm the connectivity between the MSS' on a ping request, or clears the counts that are established by the MSS that is sending the clear request. |
| advertisement { | 0x5C | -- | -- | Opens an advertisement context. The current state of one or more counters can be described within this context. This is sent by the authoritative MSS. |
| nas_advertisement { | 0x5D | -- | -- | Opens an advertisement context. The current state of the NAS can be described within this context. |
| synchronization { | 0x5E | -- | -- | Opens a synchronization context. If the non-authoritative MSS reestablishes a connection with the authoritative MSS, it will send all the counts that it establishes for the authoritative MSS. |

4.2.3.2. Reply Commands

| | | | | |
|---|---|---|---|---|
| reservation_reply { | 0x61 | -- | -- | Opens a reservation reply context. The current state of one or more counters can be described within this context. It is also bound to information about the success of the initiating reservation command. |
| cancel_reservation_reply { | 0x62 | -- | -- | Opens a cancel reservation reply context. This context behaves as a reservation reply context, except that it contains information about canceled reservations. |
| activation_reply { | 0x63 | -- | -- | Opens an activation reply context. This context behaves as a reservation reply context, except |

50325-041 - APPENDIX
(WGM 578)

-55-

| | | | |
|---|---|---|---|
| termination_reply { | 0x64 | - - | Opens a termination reply context. This context behaves as a reservation reply context, except that it contains information about terminated activations. |
| getcounts_reply { | 0x65 | - - | Opens a get counts reply context. It returns the active and reserve counts of each requested counters. This operation is sent from one MSS to another. |
| addNgetcounts_reply { | 0x66 | - - | Opens an add and get counts reply context. It returns the active and reserve counts of each requested counters. This operation is sent from one MSS to another. |
| query_reply { | 0x67 | - - | Opens a query reply context. The current state of one or more queried counters are described within this context. This operation is sent from a MSS to a GUI. |
| reset_reply { | 0x68 | - - | Opens a reset reply context for the stats, the counts, or both. Operation success are described within this context. This operation is sent from a MSS to a GUI. |
| get_reply { | 0x69 | - - | Opens a get reply context. This context returns the current MSS configurable values. |
| set_reply { | 0x6A | - - | Opens a set reply context. This context returns the current MSS configurable values. |
| hello_reply { | 0x6B | - - | Opens a hello reply context. This context confirms the connectivity between the MSS' on a ping request, or confirms that the counters have been cleared on a clear request. |

4.2.3.3. Counter Commands

| | | | |
|---|---|---|---|
| counter { | 0x71 | -- | -- | Opens a counter context. |

5. Required Settings

The following sections define the settings that are required in each request or reply packet based on the enclosing basic and reply command. "Global" settings are the header set commands that are common to all counters in each request or reply packet. "Local" settings are the set commands that are required in each instance of a counter. Each setting in each packet has to follow the same order as shown below.

50325-041 - APPENDIX
(WGM 578)

5.1. reservation, cancel_reservation, activation, termination, getcounts, addNgetcounts

5.1.1. Global settings
- version_num
- sequence_num
- nas_name
- nas_port
- force_acceptance (reservation only)

5.1.2. Local settings
- counter_name
- counter_type
- counter_handle
- max_count
- hp_threshold

5.2. reservation_reply, cancel_reservation_reply, activation_reply, termination_reply, getcounts_reply, addNgetcounts_reply

5.2.1. Global settings
- version_num
- sequence_num
- status

5.2.2. Local settings
- counter_name
- counter_type
- counter_handle
- got_count
- reserve_count
- active_count

5.3. advertisement

5.3.1. Global settings
- version_num
- sequence_num

5.3.2. Local settings
- counter_name
- counter_type if the counter exists :
- reserve_count
- active_count
- max_count
- hp_threshold else if the counter is removed :
- invalid_counter 50325-041 - APPENDIX
(WGM 578)

5.4. *nas_advertisement*

5.4.1. Global settings
- version_num
- sequence_num

5.4.2. Local settings
- nas_name
- state

5.5. *synchronization*

5.5.1. Global settings
- version_num
- sequence_num

5.5.2. Local settings
- counter_name
- counter_type
- max_count
- hp_threshold There can be 0 or more number of reservation and activation's nas names and nas ports :
- res_nasname
- res_nasport
- act_nasname
- act_nasport

5.6. *query*

5.6.1. Global settings
- version_num
- sequence_num if the request is for multiple counters :
- sub_operation
- counter_type if the GUI wants to get the next counter of a specific counter :
- last_counter_name
- last_counter_type This is used to restrict the number of returned counters :
- max_counter_return

5.6.2. Local settings if request is for a specific counter :
- counter_name
- counter_type
-

50325-041 - APPENDIX
(WGM 578)

5.7. query_reply

5.7.1. Global settings
- version_num
- sequence_num if the reply is for multiple counters :
- sub_operation
- counter_type
- more_indicator

5.7.2. Local settings
- counter_name
- counter_type if the counter exists :
- reserve_count
- active_count
- numof_rejects
- numof_oversubscribes
- high_mark else if the counter does not exist :
- invalid_counter

5.8. reset

5.8.1. Global settings
- version_num
- sequence_num

5.8.2. Local settings
- counter_name
- counter_type
- reset_type

5.9. reset_reply

5.9.1. Global settings
- version_num
- sequence_num

5.9.2. Local settings
- counter_name
- counter_type
- status

5.10. get

5.10.1. Global settings
- version_num
- sequence_num
-

50325-041 - APPENDIX
(WGM 578)

-59-

5.10.2. Local settings
no settings required

*5.11. get_reply*

5.11.1. Global settings
- version_num
- sequence_num

5.11.2. Local settings
- res_timeout
- com_timeout
- batch_timeout
- numof_transactions
- alive_time
- last_reset_time

*5.12. set*

5.12.1. Global settings
- version_num
- sequence_num

5.12.2. Local settings
- res_timeout
- com_timeout
- batch_timeout
- reset_global_stats

*5.13. set_reply*

5.13.1. Global settings
- version_num
- sequence_num

5.13.2. Local settings
- status

*5.14. hello and hello_reply*

5.14.1. Global settings
- version_num
- sequence_num

5.14.2. Local settings
- hello_type

6. Example Session
The following are the examples for a reservation request, a reservation reply, and a synchronization packets.

50325-041 - APPENDIX
(WGM 578)

6.1. Verbose Mode

The sample packets that are shown in ASCII format here are for the reader to read and understand the protocol easily.

```
version_num 1
sequence_num 1234
reservation {
nas_name 11.22.33.44
nas_port 90
force_acceptance false
counter {
        counter_name A
        counter_type user
        counter_handle 12345
        max_count 30
        hp_threshold 15
    }
    counter {
        counter_name B
        counter_type group
        counter_handle 23456
        max_count 20
        hp_threshold 13
    }
};
```

```
version_num 1
sequence_num 1234
reservation_reply {
status pass
counter {
        counter_name A
        counter_type user
        counter_handle 12345
        got_count true
        reserve_count 10
        active_count 7
    }
    counter {
        counter_name B
        counter_type group
        counter_handle 23456
        got_count true
        reserve_count 11
        active_count 3
    }
};
```

```
version_num 1
sequence_num 2345
synchronization {
   counter {
        counter_name joe
        counter type user
        max_count 30
```

50325-041 - APPENDIX
(WGM 578)

-61-

```
            hp_threshold 12
            res_nasname 11.22.33.44
            res_nasport 90
            res_nasname 11.22.33.55
            res_nasport 91
            act_nasname 22.33.44.55
            act_nasport 92
        }
        counter {
            counter_name peter
            counter_type group
            res_nas_port 11.22.33.66 92
            act_nas_port 22.33.44.66 93
            max_count 25
            hp_threshold 12
            res_nasname 11.22.33.66
            res_nasport 92
            act_nasname 22.33.44.66
            act_nasport 93
        }
    };
```

6.2. Binary Mode

The following is the same exchange as the last example, but it shows the actual datastream. Note that the comments (shown in *[square brackets]*) are not part of the data stream.

```
0x21 0x01 [version_num 1]
0x22 0x00 0x00 0x04 0xD2
[sequence_num 1234]
0x51 [reservation {]
0x23 0x0B '1' '1' '.' '2' '2' '.' '3' '3' '.'
'4' '4' [nasname 11.22.33.44]
0x24 0x02 '9' '0' [nasport 90]
0x25 0x00 [force_oversubscription false]
0x71 [counter {]
    0x27 0x01 'A' [counter_name A]
    0x28 0x01 [counter_type user]
    0x45 0x00 0x00 0x30 0x39
[counter_handle 12345]
    0x29 0x00 0x00 0x00 0x1E
[max_count 30]
    0x30 0x00 0x00 0x00 0x0F
[hp_threshold 15]
    0x02 [}]
  0x71 [counter {]
    0x27 0x01 'B' [counter_name B]
    0x28 0x02 [counter_type group]
    0x45 0x00 0x00 0x5B 0xA0
[counter_handle 23456]
    0x29 0x00 0x00 0x00 0x14
[max_count 20]
    0x30 0x00 0x00 0x00 0x0D
```

50325-041 - APPENDIX
(WGM 578)

[hp_threshold 13]
    0x02 [}]
0x02 0x00 [};]

0x21 0x01 [version_num 1]
                                0x22 0x00 0x00 0x04 0xD2
                                [sequence_num 1234]
                                0x61 [reservation_reply {]
                                0x26 0x00 [status pass]
                                0x71 [counter {]
                                      0x27 0x01 'A' [counter_name A]
                                        0x28 0x01 [counter_type user]
                                        0x45 0x00 0x00 0x30 0x39
                                [counter_handle 12345]
                                        0x44 0x01 [got_count true]
                                        0x2B 0x00 0x00 0x00 0x0A
                                [reserve_count 10]
                                        0x2C 0x00 0x00 0x00 0x07
                                [active_count 7]
                                0x02 [}]
                                0x71 [counter {]
                                      0x27 0x01 'B' [counter_name B]
                                      0x28 0x02 [counter_type group]
                                      0x45 0x00 0x00 0x5B 0xA0
                                [counter_handle 23456]
                                      0x44 0x01 [got_count true]
                                      0x2B 0x00 0x00 0x00 0x0B
                                [reserve_count 11]
                                      0x2C 0x00 0x00 0x00 0x03
                                [active_count 3]
                                0x02 [}]
                                0x02 0x00 [};]

0x21 0x01 [version_num 1]
0x22 0x00 0x00 0x09 0x29 [sequence_num 2345]
0x5B [synchronization {]
    0x71 [counter {]
        0x27 0x03 'j' 'o' 'e' [counter_name joe]
        0x28 0x01 [counter type user]
        0x29 0x00 0x00 0x00 0x1E
[max_count 30]
        0x2A 0x00 0x00 0x00 0x0C
[hp_threshold 12]
        0x2D 0x0B '11.22.33.44'
[res_nasname 11.22.33.44]
            0x2E 0x02 '90' [res_nasport 90]
        0x2D 0x0B '11.22.33.55'
[res_nasname 11.22.33.55]
            0x2E 0x02 '91' [res_nasport 91]
        0x2F 0x0B '22.33.44.55'
[act_nasname 22.33.44.55]
            0x30 0x02 '92' [act_nasport 92]
    0x02 [}]
    0x71 [counter {]

50325-041 - APPENDIX
(WGM 578)

```
        0x27 0x05 'peter' [counter_name
peter]
        0x28 0x02 [counter_type group]
        0x29 0x00 0x00 0x00 0x19
[max_count 25]
        0x2A 0x00 0x00 0x00 0x0C
[hp_threshold 12]
        0x2D 0x0B '11.22.33.66'
[res_nasname 11.22.33.66]
        0x2E 0x02 '92' [res_nasport 92]
        0x2F 0x0B '22.33.44.66'
[act_nasname 22.33.44.66]
        0x30 0x02 '93' [act_nasport 93]
0x02 [}]
0x02 0x00 [};]
```

7. Sample packets

7.1. Reservation and Reservation Reply

```
version_num 1
sequence_num 1
reservation {
nas_name 11.22.33.44
nas_port 90
force_acceptance false
    counter {
        counter_name A
        counter_type user
        counter_handle 12345
        max_count 30
        hp_threshold 15
    }
    counter {
        counter_name B
        counter_type group
        counter_handle 23456
        max_count 20
        hp_threshold 13
    }
};
```

```
version_num 1
sequence_num 1
reservation_reply {
status pass
    counter {
        counter_name A
        counter_type user
        counter_handle 12345
        got_count true
        reserve_count 10
        active_count 7
    }
```

```
                                    counter {
                                        counter_name B
                                        counter_type group
                                        counter_handle 23456
                                        got_count true
                                        reserve_count 11
                                        active_count 3
                                    }
                                };
```

7.2. Cancel Reservation and Cancel Reservation Reply

```
version_num 1
sequence_num 2
cancel_reservation {
nas_name 11.22.33.44
nas_port 90
    counter {
        counter_name A
        counter_type user
        counter_handle 34567
        max_count 30
        hp_threshold 15
    }
    counter {
        counter_name B
        counter_type group
        counter_handle 34568
        max_count 20
        hp_threshold 13
    }
};
                                    version_num 1
                                    sequence_num 2
                                    cancel_reservation_reply {
                                    status pass
                                        counter {
                                            counter_name A
                                            counter_type user
                                            counter_handle 34567
                                            got_count true
                                            reserve_count 10
                                            active_count 7
                                        }
                                        counter {
                                            counter_name B
                                            counter_type group
                                            counter_handle 34568
                                            got_count true
                                            reserve_count 11
                                            active_count 3
                                        }
                                    };
```

50325-041 - APPENDIX
(WGM 578)

-65-

7.3. Activation and Activation Reply

```
version_num 1
sequence_num 3
activation {
nas_name 11.22.33.44
nas_port 90
    counter {
        counter_name A
        counter_type user
        counter_handle 11111
        max_count 30
        hp_threshold 15
    }
    counter {
        counter_name B
        counter_type group
        counter_handle 22222
        max_count 20
        hp_threshold 13
    }
};
```

```
                                        version_num 1
                                        sequence_num 3
                                        activation_reply {
                                        status pass
                                            counter {
                                                counter_name A
                                                counter_type user
                                                counter_handle 11111
                                                got_count true
                                                reserve_count 10
                                                active_count 7
                                            }
                                            counter {
                                                counter_name B
                                                counter_type group
                                                counter_handle 22222
                                                got_count true
                                                reserve_count 11
                                                active_count 3
                                            }
                                        };
```

7.4. Termination and Termination Reply

```
version_num 1
sequence_num 4
termination {
nas_name 11.22.33.44
nas_port 90
    counter {
        counter_name A
        counter_type user
        counter_handle 33333
```

50325-041 - APPENDIX
(WGM 578)

```
            max_count 30
            hp_threshold 15
        }
        counter {
            counter_name B
            counter_type group
            counter_handle 44444
            max_count 20
            hp_threshold 13
        }
};
                                            version_num 1
                                            sequence_num 4
                                            termination_reply {
                                            status pass
                                                counter {
                                                    counter_name A
                                                    counter_type user
                                                    counter_handle 33333
                                                    got_count true
                                                    reserve_count 10
                                                    active_count 7
                                                }
                                                counter {
                                                    counter_name B
                                                    counter_type group
                                                    counter_handle 44444
                                                    got_count true
                                                    reserve_count 11
                                                    active_count 3
                                                }
                                            };
```

7.5. Getcounts and Getcounts Reply

```
version_num 1
sequence_num 5
getcounts {
nas_name 11.22.33.44
nas_port 90
    counter {
        counter_name A
        counter_type user
        counter_handle 55555
        max_count 30
        hp_threshold 15
    }
    counter {
```

50325-041 - APPENDIX
(WGM 578)

```
            counter_name B
            counter_type group
            counter_handle 66666
            max_count 20
            hp_threshold 13
        }
    };
                                            version_num 1
                                            sequence_num 5
                                            getcounts_reply {
                                            status pass
                                                counter {
                                                    counter_name A
                                                    counter_type user
                                                    counter_handle 55555
                                                    got_count true
                                                    reserve_count 10
                                                    active_count 7
                                                }
                                                counter {
                                                    counter_name B
                                                    counter_type group
                                                    counter_handle 66666
                                                    got_count false
                                                    reserve_count 0
                                                    active_count 0
                                                }
                                            };
```

7.6. AddNgetcounts and AddNgetcounts Reply

```
version_num 1
sequence_num 6
addNgetcounts {
nas_name 11.22.33.44
nas_port 90
    counter {
        counter_name A
        counter_type user
        counter_handle 77777
        max_count 30
        hp_threshold 15
    }
    counter {
        counter_name B
        counter_type group
        counter_handle 88888
        max_count 20
        hp_threshold 13
    }
};
                                            version_num 1
                                            sequence_num 6
                                            addNgetcounts_reply {
```

50325-041 - APPENDIX
(WGM 578)

-68-

```
status pass
    counter {
        counter_name A
        counter_type user
        counter_handle 77777
        got_count false
        reserve_count 0
        active_count 0
    }
    counter {
        counter_name B
        counter_type group
        counter_handle 88888
        got_count true
        reserve_count 11
        active_count 3
    }
};
```

7.7. Advertisement

```
version_num 1
sequence_num 7
advertisement {
    counter {
        counter_name A
        counter_type user
        invalid_counter true
    }
    counter {
        counter_name B
        counter_type group
        reserve_count 5
        active_count 10
        max_count 20
        hp_threshold 13
    }
};
```

7.8. NAS_Advertisement

```
version_num 1
sequence_num 8
nas_advertisement {
    nas_name 11.22.33.44
    state up
};
```

7.9. Synchronization

```
version_num 1
sequence_num 9
synchronization {
    counter {
        counter_name joe
        counter_type user
```

50325-041 - APPENDIX
(WGM 578)

-69-

```
            max_count 30
            hp_threshold 12
            res_nasname 11.22.33.44
            res_nasport 90
            res_nasname 11.22.33.55
            res_nasport 91
            act_nasname 22.33.44.55
            act_nasport 92
        }
        counter {
            counter_name peter
            counter_type group
            max_count 25
            hp_threshold 12
            res_nasname 11.22.33.66
            res_nasport 92
            act_nasname 22.33.44.66
            act_nasport 93
        }
};
```

7.10. Query and Query Reply

```
version_num 1
sequence_num 10
query {
    counter {
        counter_name A
        counter_type user
    }
};
```

```
                                        version_num 1
                                        sequence_num 10
                                        query_reply {
                                            counter {
                                                counter_name A
                                                counter_type user
                                                reserve_count 10
                                                active_count 7
                                                numof_rejects 2
                                                numof_oversubscribes 1
                                                high_mark 21
                                            }
                                        };
```

```
version_num 1
sequence_num 11
query {
sub_operation rejects
counter_type user
};
```

```
                                        version_num 1
                                        sequence_num 11
                                        query_reply {
                                            sub_operation rejects
```

50325-041 - APPENDIX
(WGM 578)

```
                    counter_type user
                    more_indicator false
                        counter {
                            counter_name A
                            counter_type user
                            reserve_count 10
                            active_count 7
                            numof_rejects 5
                            numof_oversubscribes 5
                            high_mark 35
                        }
                        counter {
                            counter_name B
                            counter_type user
                            reserve_count 7
                            active_count 8
                            numof_rejects 9
                            numof_oversubscribes 1
                            high_mark 25
                        }
                        counter {
                            counter_name C
                            counter_type user
                            reserve_count 2
                            active_count 10
                            numof_rejects 1
                            numof_oversubscribes 0
                            high_mark 20
                        }
                        counter {
                            counter_name D
                            counter_type user
                            reserve_count 11
                            active_count 11
                            numof_rejects 3
                            numof_oversubscribes 0
                            high_mark 30
                        }
                        counter {
                            counter_name E
                            counter_type user
                            reserve_count 10
                            active_count 7
                            numof_rejects 5
                            numof_oversubscribes 5
                            high_mark 35
                        }
                    };
```

50325-041 - APPENDIX
(WGM 578)

-71-

```
version_num 1
sequence_num 12
query {
sub_operation oversubscribed
counter_type all
last_counter_name B
last_counter_type user
max_counter_return 3
};
```

```
                              version_num 1
                              sequence_num 12
                              query_reply {
                              sub_operation oversubscribed
                              counter_type all
                              more_indicator true
                              counter {
                                      counter_name C
                                      counter_type user
                                      reserve_count 2
                                      active_count 10
                                      numof_rejects 0
                                      numof_oversubscribes 10
                                      high_mark 40
                              }
                              counter {
                                      counter_name D
                                      counter_type user
                                      reserve_count 11
                                      active_count 11
                                      numof_rejects 3
                                      numof_oversubscribes 3
                                      high_mark 30
                              }
                              counter {
                                      counter_name E
                                      counter_type group
                                      reserve_count 10
                                      active_count 7
                                      numof_rejects 5
                                      numof_oversubscribes 5
                                      high_mark 35
                              }
                              };
```

7.11. Reset and Reset Reply

```
version_num 1
sequence_num 13
reset {
   counter {
        counter_name joe
        counter_type user
        reset_type stats
   }
```

50325-041 - APPENDIX
(WGM 578)

-72-

```
counter {
    counter_name peter
    counter_type group
    reset_type counts
  }
};
```

```
version_num 1
sequence_num 13
reset_reply {
    counter {
        counter_name joe
        counter_type user
        status pass
    }
    counter {
        counter_name peter
        counter_type group
        status fail
    }
};
```

7.12. Get and Get Reply

```
version_num 1
sequence_num 14
get {
};
```

```
version_num 1
sequence_num 14
get_reply {
    res_timeout 1000 ms
    com_timeout 500 ms
    batch_timeout 1000 ms
    numof_transactions 2000
    alive_time 10000 s
    last_reset_time 600s
};
```

7.13. Set and Set Reply

```
version_num 1
sequence_num 15
set {
    res_timeout 2000 ms
    com_timeout 1000 ms
    batch_timeout 1000 ms
    reset_global_stats true
};
```

```
version_num 1
sequence_num 15
set_reply {
    status pass
};
```

50325-041 - APPENDIX
(WGM 578)

7.14. Hello and Hello Reply

```
version_num 1
sequence_num 16
hello {
    hello_type ping
};
```

```
                                    version_num 1
                                    sequence_num 16
                                    hello_reply {
                                        hello_type ping
                                    };
```

```
version_num 1
sequence_num 17
hello {
    hello_type clear
};
```

```
                                    version_num 1
                                    sequence_num 17
                                    hello_reply {
                                        hello_type clear
                                    };
```

8. Summary

The TLV binary mode prevents the protocol from being too "chatty" and reduces the amount of time that must be spent parsing input.

What is claimed is:

1. A method for authorizing a data communication session between a client and a first server, comprising the computer-implemented steps of:

receiving a request to establish the session, wherein the request is associated with a particular entity that is associated with the client;

determining whether authorization of the session can be performed locally at a second server;

if authorization of the session can be performed locally at the second server, then informing the first server that the session may be established between the client and the first server for the particular entity; and after informing the first server, informing a third server that is associated with the particular entity that the session has been authorized to be established for the particular entity.

2. The method as recited in claim 1, further comprising the steps of:

if authorization of the session cannot be performed locally at the second server, then requesting the third server to authorize the session between the client and the first server; and informing the first server, based on a response received from the third server, whether the session may be authorized.

3. The method as recited in claim 1, wherein the step of determining whether authorization of the session can be performed locally at the second server comprises the steps of:

determining a session counter value, wherein the session counter value indicates the number of sessions that are currently active for the particular entity;

determining a session threshold value, wherein the session threshold value indicates a threshold as to a number of sessions that may be currently active before sessions cannot be authorized locally by the second server; and comparing the session counter value with the session threshold value to determine whether authorization of the session can be performed locally at the second server.

4. The method as recited in claim 1, wherein the step of determining whether authorization of the session can be performed locally at the second server comprises the step of determining whether the second server has received a prior request for the particular entity.

5. The method as recited in claim 1, further comprising the steps of, prior to receiving the request, maintaining data that is associated with the second server, wherein the data includes, a session counter value, wherein the session counter value indicates the number of sessions that are currently active for the particular entity; and a session threshold value, wherein the session threshold value indicates a particular number of sessions that may be currently active before sessions cannot be authorized locally by the second server.

6. The method as recited in claim 5, wherein the step of maintaining data that is associated with the second server further comprises the step of maintaining a server identifier, wherein the server identifier identifies a particular server that is assigned to the particular entity.

7. The method as recited in claim 1, wherein the step of receiving the request comprises the step of receiving a connection request, wherein the connection request requests authorization to establish a Point-to-Point Protocol connection between the client and the first server.

8. The method as recited in claim 1, wherein the step of identifying the third server comprises the step of retrieving global data, wherein the global data maps a particular server to each entity.

9. The method as recited in claim 1, wherein the step of identifying the third server comprises the step of retrieving a server identifier, wherein the server identifier identifies a particular server that is assigned to the particular entity.

10. The method as recited in claim 1, wherein the step of informing the third server further comprises the steps of:

determining, at the third server, whether other servers have previously authorized sessions for the particular entity; and if other servers have previously authorized sessions for the particular entity, then informing the other servers that the session has been authorized for the particular entity.

11. The method as recited in claim 10, further comprising the steps of:

prior to informing the other servers, maintaining session counter values at each of the other servers, wherein the session counter values indicate the number of sessions that are currently active for the particular entity; and after being informed that the session has been authorized for the particular entity, updating the session counter values at each of the other servers to reflect that the session has been authorized for the particular entity.

12. A method for broadcasting session information to one or more servers, the method comprising the computer-implemented steps of:

receiving a message from a first server, wherein the message indicates that a session has been authorized for a particular entity;

determining whether one or more other servers have previously authorized sessions for the particular entity; and if one or more other servers have previously authorized sessions for the particular entity, then informing the one or more other servers that another session has been authorized for the particular entity.

13. The method as recited in claim 12, wherein:

prior to receiving the message from the first server, maintaining data that is associated with a second server, wherein the data includes a session counter value, wherein the session counter value indicates the number of sessions that are currently active for the particular entity; and a server list, wherein the server list identifies the one or more other servers that have previously authorized sessions for the particular entity.

14. A method for authorizing a data communication session between a client and a server in a network, the method comprising the computer-implemented steps of:

receiving a connection request at a distributed session counter for authorization to establish a session between the client and the server, wherein the connection request is associated with a particular entity;

determining whether authorization of the session can be performed locally at the distributed session counter;

if authorization of the session can be performed locally at the distributed session counter, then sending an authorization granted message to the server to indicate that the session may be established between the client and the server for the particular entity;

identifying an authoritative distributed session counter that is associated with the particular entity; and after sending the authorization granted message to the server, sending a authorization update message to the authoritative distributed session counter, wherein the authorization update message notifies the authoritative distribution counter that the session has been authorized to be established for the particular entity.

15. The method as recited in claim 14, further comprising the steps of:

if authorization of the session cannot be performed locally at the distributed session counter, then sending an authorization request message to the authoritative distributed session to request authorization to authorize the session between the client and the server; and sending a response to the server based on a response message that is received from the authoritative distributed session, wherein the response message indicates whether the session should be authorized.

16. The method as recited in claim 14, wherein the step of determining whether authorization of the session can be performed locally at the distributed session counter comprises the steps of:

determining a local session counter value, wherein the local session counter value indicates the number of sessions that are currently active for the particular entity;

determining a local session threshold value, wherein the local session threshold value indicates a threshold as to a number of sessions that may be currently active before sessions cannot be authorized locally by the distributed session counter; and comparing the local session counter value with the local session threshold value to determine whether authorization of the session can be performed locally at the distributed session counter.

17. The method as recited in claim 14, wherein the step of determining whether authorization of the session can be performed locally at the distributed session counter comprises the step of determining whether the distributed session counter has received a prior connection request for the particular entity.

18. The method as recited in claim 14, further comprising the steps of, prior to receiving the connection request, maintaining a connection data storage area, wherein the connection data storage area includes a local session counter value, wherein the local session counter value indicates the number of sessions that are currently active for the particular entity; and a local session threshold value, wherein the local session threshold value indicates a particular number of sessions that may be currently active before sessions cannot be authorized locally by the distributed session counter.

19. The method as recited in claim 18, wherein the step of maintaining the connection data storage area further comprises the step of maintaining an authoritative distributed session counter identifier, wherein the authoritative distributed session counter identifier identifies a particular authoritative distributed session counter that is assigned to the particular entity.

20. The method as recited in claim 14, wherein the step of receiving the connection request comprises the steps of receiving a request to authorize a Point-to-Point Protocol connection between the client and the server.

21. The method as recited in claim 14, wherein the step of identifying the authoritative distributed session counter comprises the step of interfacing with a global storage area, wherein the global storage area maps a particular authoritative distributed session counter to each entity.

22. The method as recited in claim 14, wherein the step of identifying the authoritative distributed session counter comprises the steps of:

retrieving an authoritative distributed session counter identifier, wherein the authoritative distributed session counter identifier identifies the authoritative distributed session counter that is assigned to the particular entity.

23. The method as recited in claim 14, wherein the step of sending the authorization update message to the authoritative distributed session counter further comprises the steps of:

determining, by the authoritative distributed session counter, whether other distributed session counters have previously authorized sessions for the particular entity; and if other distributed session counters have previously authorized sessions for the particular entity, then broadcasting an update message to the other distributed session counters to indicate that another session has been authorized for the particular entity.

24. The method as recited in claim 23, further comprising the steps of:

prior to the other distributed session counters receiving the update message, maintaining a local session counter value at each of the other distributed session counters, wherein the local session counter value indicates the number of sessions that are currently active for the particular entity; and after receiving the update message, updating the local session counter value at each of the other distributed session counters based on the update message.

25. A method for broadcasting session update information to distributed session counters, the method comprising the computer-implemented steps of:

receiving an authorization update message from a distributed session counter, wherein the authorization update message indicates that a session has been authorized for a particular entity;

determining whether other distributed session counters have previously authorized sessions for the particular entity; and if other distributed session counters have previously authorized sessions for the particular entity, then broadcasting an update message to the other distributed session counters, wherein the update message notifies the other distributed session counters that another session has been authorized for the particular entity.

26. The method as recited in claim 25, wherein:

prior to receiving the authorization update message, maintaining a connection data storage area, wherein the connection data storage area includes a global session counter value, wherein the global session counter value indicates a global value of the number of sessions that are currently active for the particular entity; and a local distributed session counter list, wherein the local distributed session counter list identifies the other distributed session counters that have previously authorized sessions for the particular entity.

27. A computer apparatus comprising:

a processor; and a memory coupled to the processor, the memory containing one or more sequences of instructions for authorizing a data communication session between a client and a first server, wherein execution of the one or more sequences of instructions by the processor causes the processor to perform the steps of:
- receiving a request to establish the session, wherein the request is associated with a particular entity that is associated with the client;
- determining whether authorization of the session can be performed locally a second server;
- if authorization of the session can be performed locally at the second server, then
- informing the first server that the session may be established between the client and the first server for the particular entity;
- identifying a third server that is associated with the particular entity; and
- after informing the first server, informing the third server that the session has been authorized to be established for the particular entity.

28. A computer apparatus comprising:

a processor; and a memory coupled to the processor, the memory containing one or more sequences of instructions for broadcasting session information to one or more servers, wherein execution of the one or more sequences of instructions by the processor causes the processor to perform the steps of:
- receiving a message from a first server, wherein the message indicates that a session has been authorized for a particular entity;
- determining whether one or more other servers have previously authorized sessions for the particular entity; and
- if one or more other servers have previously authorized sessions for the particular entity then,
- informing the one or more other servers that another session has been authorized for the particular entity.

* * * * *